United States Patent
Kim et al.

(10) Patent No.: US 9,201,259 B2
(45) Date of Patent: Dec. 1, 2015

(54) TOUCH SENSING TYPE LIQUID CRYSTAL DISPLAY DEVICE AND METHOD OF FABRICATING THE SAME

(75) Inventors: Sung-Hee Kim, Paju-si (KR); Jin-Wuk Kim, Goyang-si (KR); Joong-Pill Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 444 days.

(21) Appl. No.: 13/049,563

(22) Filed: Mar. 16, 2011

(65) Prior Publication Data

US 2011/0228188 A1 Sep. 22, 2011

(30) Foreign Application Priority Data

Mar. 19, 2010 (KR) .................. 10-2010-0024847
Apr. 7, 2010 (KR) .................. 10-2010-0031961
Feb. 22, 2011 (KR) .................. 10-2011-0015522

(51) Int. Cl.
*C09K 19/00* (2006.01)
*G02F 1/1333* (2006.01)

(52) U.S. Cl.
CPC ....... *G02F 1/13338* (2013.01); *B32B 2457/202* (2013.01); *B32B 2457/208* (2013.01)

(58) Field of Classification Search
None
See application file for complete search history.

(56) References Cited

U.S. PATENT DOCUMENTS

| | | | | |
|---|---|---|---|---|
| 5,354,613 | A * | 10/1994 | Quintens et al. | 428/341 |
| 6,933,064 | B2 * | 8/2005 | Anderson et al. | 428/690 |
| 7,149,032 | B2 * | 12/2006 | Ohishi et al. | 359/586 |
| 2005/0109238 | A1 * | 5/2005 | Yamaki et al. | 106/287.16 |
| 2008/0129898 | A1 * | 6/2008 | Moon | 349/12 |
| 2008/0239214 | A1 * | 10/2008 | Lee et al. | 349/106 |
| 2009/0146945 | A1 * | 6/2009 | Cho | 345/104 |
| 2009/0225047 | A1 * | 9/2009 | Lee et al. | 345/173 |
| 2009/0243477 | A1 * | 10/2009 | Saneto et al. | 313/504 |

FOREIGN PATENT DOCUMENTS

KR 1020090020772 A 2/2009
KR 1020100003717 A 1/2010

OTHER PUBLICATIONS

Office Action issued in corresponding Korean Patent Application No. 10-2010-0024847, mailed Mar. 21, 2013.

\* cited by examiner

*Primary Examiner* — Ellen S Wood
*Assistant Examiner* — Anthony J Frost
(74) *Attorney, Agent, or Firm* — Brinks Gilson & Lione

(57) ABSTRACT

A touch sensing type liquid crystal display device includes an array substrate including a first substrate, a common electrode, a pixel electrode, and a touch sensing unit; a color filter substrate including a second substrate and facing the array substrate; an anti-static layer on an outer side of the second substrate and including a conductive polymer, a UV-setting binder and transparent silica and having a sheet resistance of several tens of Mega ohms per square ($\Omega$/sq) to several Giga ohms per square ($\Omega$/sq); and a liquid crystal layer between the first substrate and an inner side of the second substrate.

50 Claims, 27 Drawing Sheets

TOUCH SENSING TYPE LIQUID CRYSTAL DISPLAY DEVICE AND METHOD OF FABRICATING THE SAME

This application claims the benefit of Korea Patent Application No. 10-2010-0024847, filed on Mar. 19, 2010, Korea Patent Application No. 10-2010-0031961, filed on Apr. 7, 2010, and Korea Patent Application No. 10-2011-0015522, filed on Feb. 22, 2011, the entire contents of which is incorporated herein by reference for all purposes as if fully set forth herein.

BACKGROUND

1. Field of the Invention

The present disclosure relates to a liquid crystal display (LCD) device, and more particularly, to a touch sensing type liquid crystal display device including an anti-static layer and a method of fabricating the same.

2. Discussion of the Related Art

Recently, the LCD device has been widely used as a technology-intensive and value-added device of next generation due to its low power consumption and portability. In general, the LCD device uses the optical anisotropy and polarization properties of liquid crystal molecules to produce an image. Due to the optical anisotropy of the liquid crystal molecules, refraction of light incident onto the liquid crystal molecules depends upon the alignment direction of the liquid crystal molecules. The liquid crystal molecules have long thin shapes that can be aligned along specific directions. The alignment direction of the liquid crystal molecules can be controlled by applying an electric field. Accordingly, the alignment of the liquid crystal molecules changes in accordance with the direction of the applied electric field and the light is refracted along the alignment direction of the liquid crystal molecules due to the optical anisotropy, thereby images displayed.

Since the LCD device including a thin film transistor (TFT) as a switching element, referred to as an active matrix LCD (AM-LCD) device, has excellent characteristics of high resolution and displaying moving images, the AM-LCD device has been widely used.

The AM-LCD device includes an array substrate, a color filter substrate and a liquid crystal layer interposed therebetween. The array substrate may include a pixel electrode and the TFT, and the color filter substrate may include a color filter layer and a common electrode. The AM-LCD device is driven by an electric field between the pixel electrode and the common electrode to have excellent properties of transmittance and aperture ratio. However, since the AM-LCD device uses a vertical electric field, the AM-LCD device has a bad viewing angle.

An in-plane switching (IPS) mode LCD device or a fringe field switching (FFS) mode LCD device may be used to resolve the above-mentioned limitations. FIG. 1 is a cross-sectional view of an IPS mode LCD device according to the related art. As shown in FIG. 1, the array substrate and the color filter substrate are separated and face each other. The array substrate includes a first substrate 10, a common electrode 17 and a pixel electrode 30. Though not shown, the array substrate may include a TFT, a gate line, a data line, and so on. The color filter substrate includes a second substrate 9, a color filter layer (not shown), and so on. A liquid crystal layer 11 is interposed between the first substrate 10 and the second substrate 9. Since the common electrode 17 and the pixel electrode 30 are formed on the first substrate 10 on the same level, a horizontal electric field "L" is generated between the common and pixel electrodes 17 and 30. The liquid crystal molecules of the liquid crystal layer 11 are driven by a horizontal electric field such that the IPS mode LCD device has a wide viewing angle.

FIGS. 2A and 2B are cross-sectional views showing turned on/off conditions of an IPS mode LCD device according to the related art. As shown in FIG. 2A, when the voltage is applied to the IPS mode LCD device, liquid crystal molecules 11a above the common electrode 17 and the pixel electrode 30 are unchanged. But, liquid crystal molecules 11b between the common electrode 17 and the pixel electrode 30 are horizontally arranged due to the horizontal electric field "L". Since the liquid crystal molecules are arranged by the horizontal electric field, the IPS mode LCD device has a characteristic of a wide viewing angle. FIG. 2B shows a condition when the voltage is not applied to the IPS mode LCD device. Because an electric field is not generated between the common and pixel electrodes 17 and 30, the arrangement of liquid crystal molecules 11 is not changed.

In the FFS mode LCD device, one of the pixel electrode and the common electrode has a plate shape in the pixel region, and the other one of the pixel electrode and the common electrode has an opening. The pixel and common electrode are formed on a lower substrate. As a result, liquid crystal molecules are driven by a fringe field between the pixel and common electrodes.

Unfortunately, since there is no the common electrode, which is formed of a conductive material, on an upper substrate in the IPS mode LCD device or the FFS mode LCD device, an anti-static layer, which is formed of a transparent conductive material such as indium-tin-oxide (ITO) and indium-zinc-oxide (IZO), is required on an outer side of the upper substrate to prevent problems resulting from a static electricity. Generally, the anti-static layer has a thickness of about 200 Å (Å) and a sheet resistance of about 500 ohms per square ($\Omega$/sq). Since the sheet resistance of the anti-static layer is substantially same as that of a metallic material, there is no damage on the device from the static electricity due to the anti-static layer.

The IPS mode LCD device or the FFS mode LCD device are used for a television, a projector, a mobile phone, a PDA, and so on. Recently, mobile devices include a touch sensor such that the device can be operated by touching.

Unfortunately, even if a capacitive overlay type touch sensor is included in the cell of the IPS mode LCD device or the FFS mode LCD device, a change of capacitance generated by a touch can not be detected because of the anti-static layer, which is formed of the transparent conductive material such as indium-tin-oxide (ITO) and indium-zinc-oxide (IZO), of the IPS mode LCD device or the FFS mode LCD device. Namely, the related art IPS mode LCD device or the FFS mode LCD device can not be operated by a touch sensor.

In more detail, when the user touches his finger onto the IPS mode LCD device or the FFS mode LCD device, the capacitance is generated between the finger and the anti-static layer of the IPS mode LCD device or the FFS mode LCD device. The capacitance is discharged into an outer space through the anti-static layer such that the touch of the user can not be detected by the capacitive overlay type touch sensor. If the anti-static layer is removed for the touch sensing, there are damages by the static electricity.

BRIEF SUMMARY

A touch sensing type liquid crystal display device includes an array substrate including a first substrate, a common electrode, a pixel electrode, and a touch sensing unit; a color filter substrate including a second substrate and facing the array substrate; an anti-static layer on an outer side of the second substrate and including a conductive polymer, a UV-setting binder and transparent silica and having a sheet resistance of several tens of Mega ohms per square (Ω/sq) to several Giga ohms per square (Ω/sq); and a liquid crystal layer between the first substrate and an inner side of the second substrate.

In another aspect of the present invention, a method of fabricating a touch sensing type liquid crystal display device includes forming a gate line, a data line, a thin film transistor, a common electrode, a pixel electrode and a touch sensing unit on a first substrate; forming an anti-static layer on an outer side of a second substrate, the anti-static layer including a conductive polymer, a UV-setting binder and transparent silica and having a sheet resistance of several tens of Mega ohms per square (a/sq) to several Giga ohms per square (Ω/sq); irradiating a UV light onto the anti-static layer such that the anti-static layer has a hardness being equal to or greater than 6H; and attaching the first and second substrates with a liquid crystal layer interposed between the first and second substrates.

In another aspect of the present invention, a method of fabricating a touch sensing type liquid crystal display device includes forming a gate line, a data line, a thin film transistor, a common electrode, a pixel electrode and a touch sensing unit on a first substrate; attaching a second substrate to the first substrate to form a liquid crystal panel, wherein the liquid crystal panel has a first thickness; etching an outer side of each of the first and second substrates such that the liquid crystal panel has a second thickness smaller than the first thickness; and forming an anti-static layer on the outer side of the second substrate, the anti-static layer including a conductive polymer, a UV-setting binder and transparent silica and having a sheet resistance of several tens of Mega ohms per square (Ω/sq) to several Giga ohms per square (Ω/sq).

In another aspect of the present invention, a touch sensing type liquid crystal display device includes an array substrate including a first substrate, a common electrode, a pixel electrode, and a touch sensing unit; a color filter substrate including a second substrate and facing the array substrate; an anti-static layer on an outer side of the second substrate and including one of a conductive polymer or a conductive inorganic material and a thermo-setting binder and having a sheet resistance of several tens of Mega ohms per square (Ω/sq) to several hundreds Mega ohms per square (Ω/sq); and a liquid crystal layer between the first substrate and an inner side of the second substrate.

In another aspect of the present invention, a method of fabricating a touch sensing type liquid crystal display device includes forming a gate line, a data line, a thin film transistor, a common electrode, a pixel electrode and a touch sensing unit on a first substrate; forming an anti-static material layer on an outer side of a second substrate by coating a liquid phase mixture including one of a conductive polymer or a conductive inorganic material and a thermo-setting binder with a solvent; curing the anti-static material layer under a temperature below 100° C. to remove the solvent and form an anti-static layer on an outer side of a second substrate, the anti-static layer having a sheet resistance of several tens of Mega ohms per square (Ω/sq) to several Giga ohms per square (Ω/sq); and attaching the first and second substrates with a liquid crystal layer interposed between the first and second substrates.

In another aspect of the present invention, a method of fabricating a touch sensing type liquid crystal display device includes forming a gate line, a data line, a thin film transistor, a common electrode, a pixel electrode and a touch sensing unit on a first substrate; attaching a second substrate to the first substrate to form a liquid crystal panel, wherein the liquid crystal panel has a first thickness; etching an outer side of each of the first and second substrates such that the liquid crystal panel has a second thickness smaller than the first thickness; forming an anti-static material layer on an outer side of the second substrate by coating a liquid phase mixture including one of a conductive polymer or a conductive inorganic material and a thermo-setting binder with a solvent; and curing the anti-static material layer under a temperature below 100° C. to remove the solvent and form an anti-static layer on an outer side of a second substrate, the anti-static layer having a sheet resistance of several tens of Mega ohms per square (Ω/sq) to several Giga ohms per square (Ω/sq).

In another aspect of the present invention, a touch sensing type liquid crystal display device includes an array substrate including a first substrate, a common electrode, a pixel electrode, and a touch sensing unit; a color filter substrate including a second substrate and facing the array substrate; an anti-static layer on an outer side of the second substrate and including a conductive polymer, one of a UV-setting binder and a thermo-setting binder, and a stabilizer and having a sheet resistance of several tens of Mega ohms per square (Ω/sq) to several Giga ohms per square (Ω/sq); and a liquid crystal layer between the first substrate and an inner side of the second substrate.

In another aspect of the present invention, a method of fabricating a touch sensing type liquid crystal display device includes forming a gate line, a data line, a thin film transistor, a common electrode, a pixel electrode and a touch sensing unit on a first substrate; forming an anti-static layer on an outer side of a second substrate, the anti-static layer including a conductive polymer, one of a UV-setting binder and a thermo-setting binder, and a stabilizer and having a sheet resistance of several tens of Mega ohms per square (Ω/sq) to several Giga ohms per square (Ω/sq); irradiating a UV light onto the anti-static layer such that the anti-static layer has a hardness being equal to or greater than 6H; and attaching the first and second substrates with a liquid crystal layer interposed between the first and second substrates.

In another aspect of the present invention, a method of fabricating a touch sensing type liquid crystal display device includes forming a gate line, a data line, a thin film transistor, a common electrode, a pixel electrode and a touch sensing unit on a first substrate; attaching a second substrate to the first substrate to form a liquid crystal panel, wherein the liquid crystal panel has a first thickness; etching an outer side of each of the first and second substrates such that the liquid crystal panel has a second thickness smaller than the first thickness; and forming an anti-static layer on the outer side of the second substrate, the anti-static layer including a conductive polymer, one of a UV-setting binder and a thermo-setting binder, and a stabilizer and having a sheet resistance of several tens of Mega ohms per square (Ω/sq) to several Giga ohms per square (Ω/sq).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE DRAWINGS AND THE PRESENTLY PREFERRED EMBODIMENTS

Reference will now be made in detail to the embodiments, examples of which are illustrated in the accompanying drawings.

Figure 1:
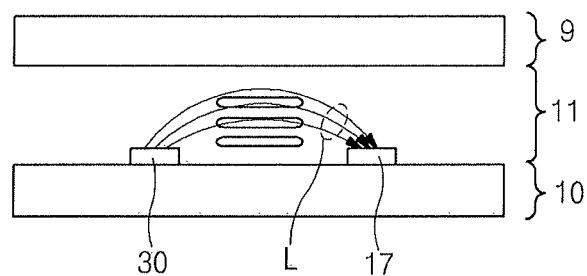
FIG. 1 is a cross-sectional view of an IPS mode LCD device according to the related art.
Figure 2A:
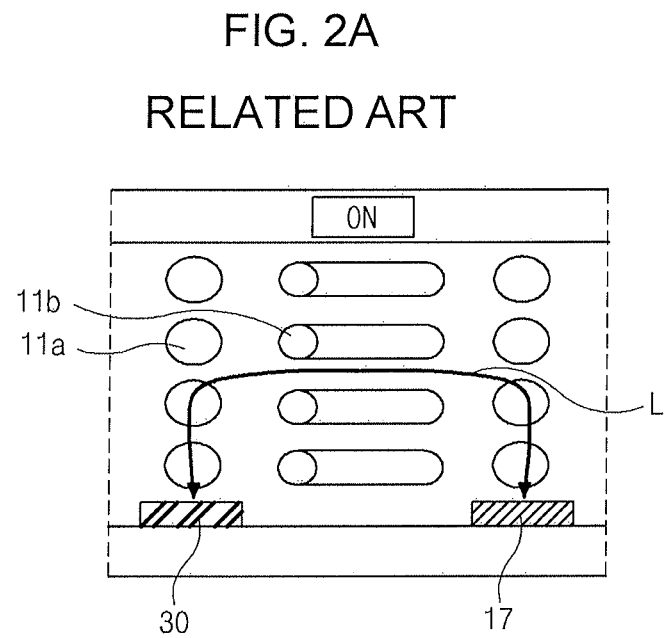
FIGS. 2A and 2B are cross-sectional views showing turned on/off conditions of an IPS mode LCD device according to the related art.
Figure 2B:
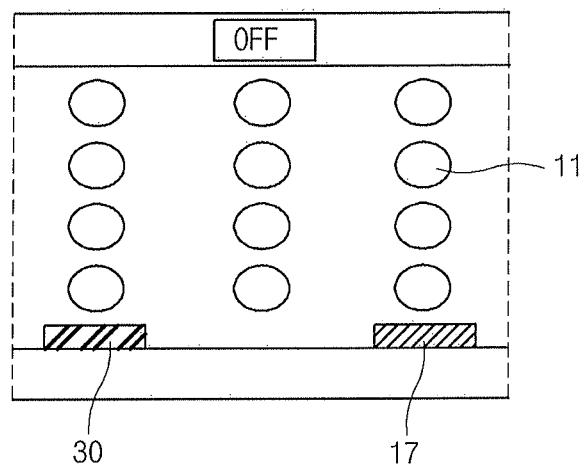
Figure 3:
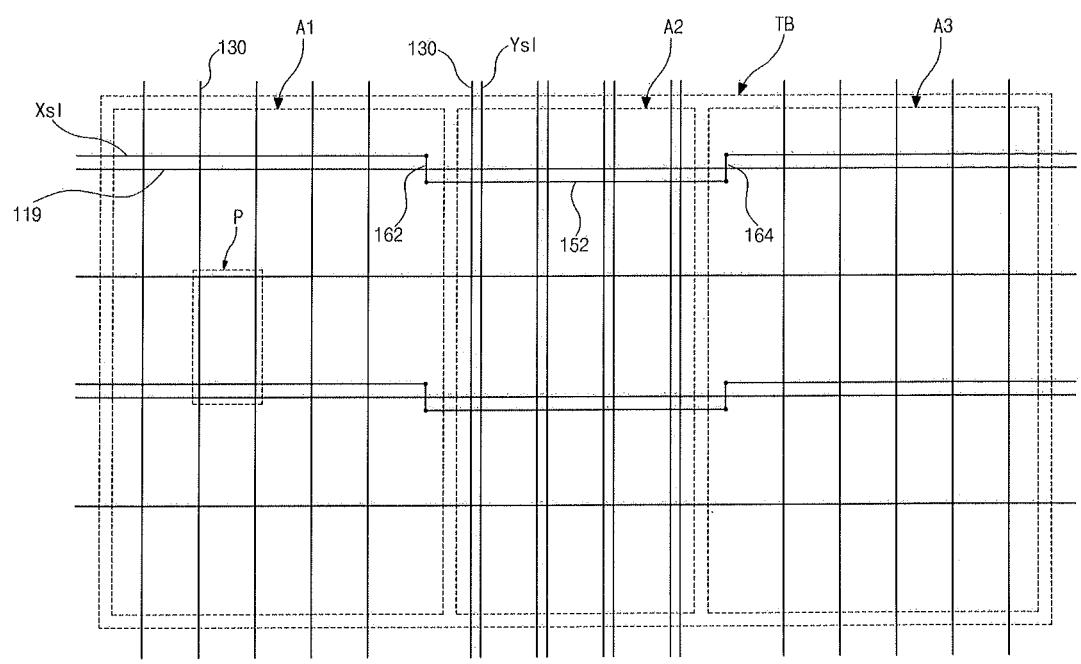
FIG. 3 is a schematic plane-view of an array substrate for a touch sensing type LCD device according to an embodiment of the present invention.

FIG. 3 is a schematic plane-view of an array substrate for a touch sensing type LCD device according to an embodiment of the present invention.

As shown in FIG. 3, a plurality of touch blocks TB are defined on an array substrate. In addition, first to third regions A1, A2 and A3 are defined in each touch block TB. The second region A2 is disposed between the first and third regions A1 and A3. The touch block TB is a unit region of touch sensing. A plurality of pixel regions P are defined in each of the first to third regions A1, A2 and A3.

A plurality of gate lines 119 extends along a first direction, i.e., an X direction, and a plurality of data lines 130 extends along a second direction, i.e., a Y direction. The gate lines 119 and the data lines 130 cross each other to define the pixel regions P.

In addition, an X direction sensing line Xsl extends along the first direction through the first region A1 and the third region A3. The X direction sensing line Xsl is disposed over the gate line 119. Namely, the X direction sensing line Xsl overlaps the gate line 119. The X direction sensing lines Xsl in the first and third regions A1 and A3 in one touch block TB is electrically connected to a connection line 152 in the second region A2. The connection line 152 extends along the gate line 119 and is spaced apart from the gate line 119 to avoid an electrical short. The connection line 152 may be formed of the same material and disposed at the same layer as the gate line 119. One end of the connection line 152 is connected to the X direction sensing line Xsl in the first region A1 through a first connection pattern 162, and the other end of the connection line 152 is connected to the X direction sensing line Xsl in the third region A3 through a second connection pattern 164.

A Y direction sensing line Ysl extends along the second direction through the second region A2. The Y direction sensing line Ysl is disposed over the data line 130. Namely, the Y direction sensing line Ysl overlaps the data line 130. Since the Y direction sensing line Ysl is disposed at a different layer than the connection line 152, there is no electrical short.

Although not shown, a common electrode having a plate shape and a pixel electrode having an opening are formed with an insulating layer therebetween. The pixel electrode in one pixel region is separated from that in another pixel region. The common electrode in one touch block TB is separated from that in another touch block TB. In addition, the common electrodes the first to third areas A1, A2 and A3 are separated from one another. An X direction sensing circuit is disposed at one end of the X direction sensing line Xsl, and a Y direction sensing circuit is disposed at one end of the Y direction sensing line Ysl. The X direction sensing circuit and the Y direction sensing circuit are positioned at a non-display area at periphery of a display area including the touch blocks TB.

When one touch block TB is touched, a change of capacitance between the pixel and common electrode are detected by the X direction sensing circuit and the Y direction sensing circuit through the X direction sending line Xsl and the Y direction sensing line Ysl, respectively. As a result, a position of the touched touch block TB is sensed.

Figure 4:
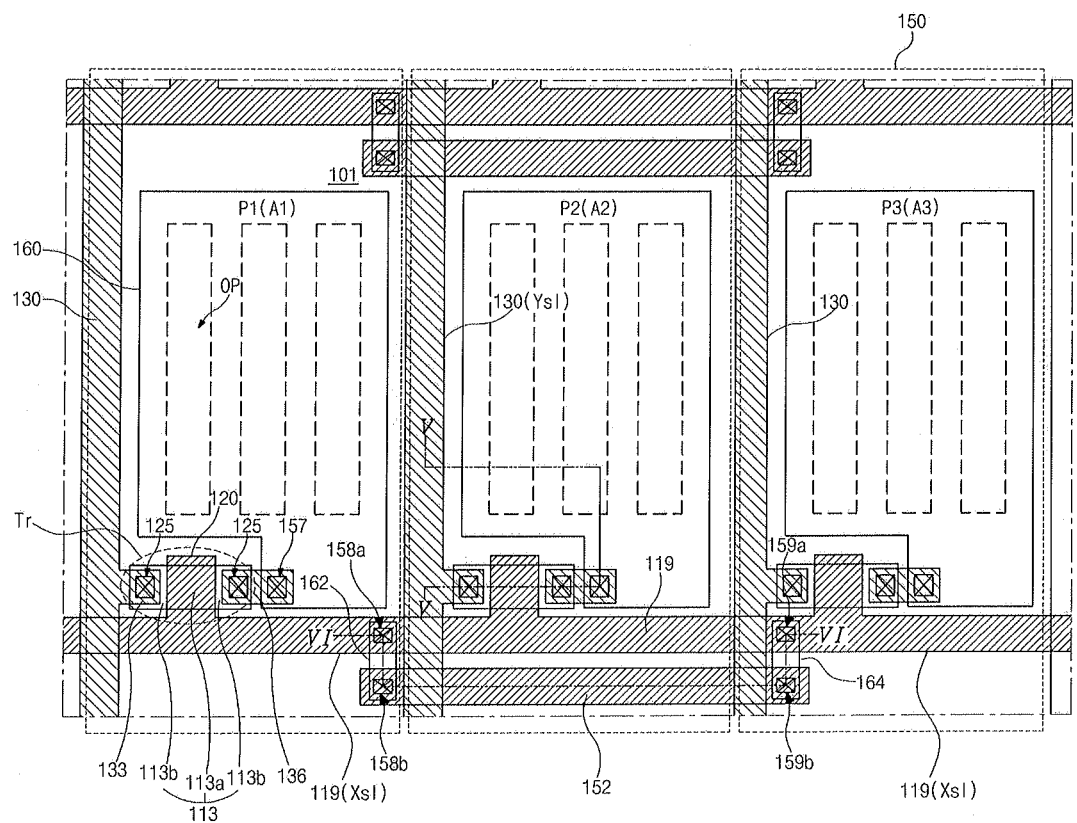
FIG. 4 is a plane-view showing a part of an array substrate for a touch sensing type LCD device according to an embodiment of the present invention.
Figure 5:
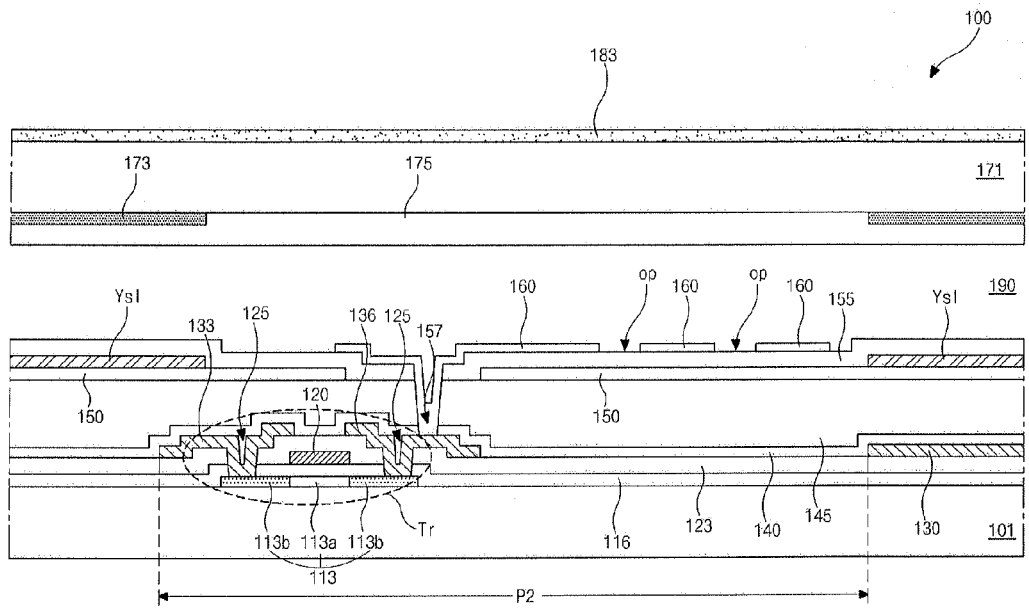
FIG. 5 is a cross-sectional view taken along the line V-V of FIG. 4.
Figure 6:
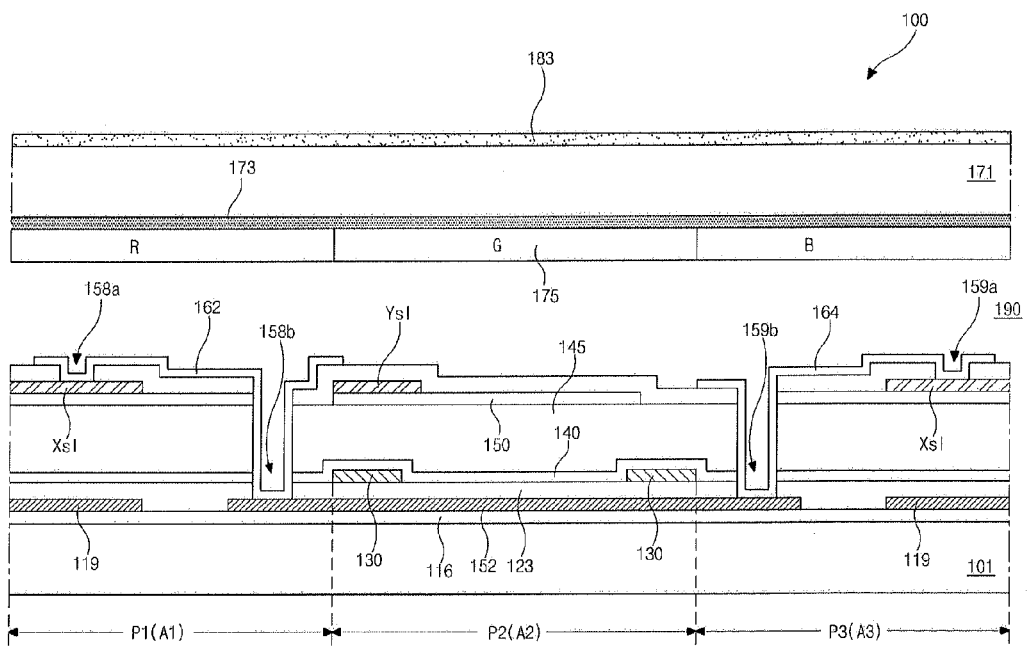
FIG. 6 is a cross-sectional view taken along the line VI-VI of FIG. 4.

FIG. 4 is a plane-view showing a part of an array substrate for a touch sensing type LCD device according to the present invention. FIG. 5 is a cross-sectional view taken along the line V-V of FIG. 4, and FIG. 6 is a cross-sectional view taken along the line VI-VI of FIG. 4. FIG. 4 shows first to third regions each including one pixel region. However, as shown in FIG. 3, each of the first to third regions may have at least one pixel region.

As shown in FIGS. 4 to 6, a gate line 119 and a data line 130 are formed on a first substrate 101. The gate and data lines 119 and 130 cross each other to define first to third pixel regions P1, P2 and P3. The first to third pixel regions P1, P2, P3 are respectively included to the first to third regions A1, A2 and A3.

In each pixel region P, a thin film transistor (TFT) Tr including a semiconductor layer 113, a gate electrode 120, a source electrode 133 and a drain electrode 136 is formed. The gate electrode 120 and the source electrode 133 respectively extend from the gate line 119 and the data line 130 such that the TFT Tr is electrically connected to the gate line 119 and the data line 130.

The semiconductor layer 113 is formed of polycrystalline silicon. A first semiconductor region 113a of a center of the semiconductor layer 113, which is formed of intrinsic polycrystalline silicon, serves as a channel, and second semiconductor regions 113b at both sides of the first semiconductor region 113a are doped by high-concentration impurities. A gate insulating layer 116 is formed on the semiconductor layer 113.

The gate electrode 120 is formed on the gate insulating layer 116 and corresponding to the first semiconductor region 113a. The gate line 119 is formed on the gate insulating layer 116 and connected to the gate electrode 120. A connection line 152 is also formed on the gate insulating layer 116 and parallel to the gate line 119. The connection line 152 is spaced apart from the gate line. The connection line 152 is disposed in the second pixel region P2 of the second region A2, and both ends of the connection line 152 are respectively disposed in the first pixel region P1 of the first region A1 and the third pixel region P3 of the third region A3.

An interlayer insulating layer 123 is formed on the gate line 119, the gate electrode 120 and the connection line 152. For example, the interlayer insulating layer 123 may be formed of an inorganic insulating material, for example, silicon oxide or silicon nitride. The interlayer insulating layer 123 and the gate insulating layer 116 are patterned to form semiconductor contact holes 125 exposing the second semiconductor regions 113b of the semiconductor layer 113.

On the interlayer insulating layer 123, the data line 130 is formed to cross the gate line 119. In addition, the source electrode 133 and the drain electrode 136 are formed on the interlayer insulating layer 123. The source and drain electrodes 133 and 136 respectively contact the second semiconductor regions 113b through the semiconductor contact holes 125.

As mentioned above, the semiconductor layer 113, the gate insulating layer 116, the gate electrode 120, the interlayer insulating layer 123, the source electrode 133 and the drain electrode 136 constitute the TFT Tr. This may be referred to as a top gate type TFT. Alternatively, a bottom gate type TFT, where a semiconductor layer is positioned between a gate electrode as a lower layer of the TFT and source and drain electrodes as a upper layer of the TFT, may be used.

A first passivation layer 140, which is formed of an inorganic insulating material, for example, silicon oxide or silicon nitride, and a second passivation layer 145, which is formed of an organic insulating material, for example, photoacryl or benzocyclobutene (BCB), are stacked on the data line 130, the source electrode 133 and the drain electrode 136. The second passivation layer 145 may have a thickness about 2 to 4 micrometers to provide a flat top surface. Since an adhesive strength between a metallic material of the data line 130 and the organic insulating material of the second passivation layer 145 is smaller than an adhesive strength between a metallic material of the data line 130 and the inorganic insulating material of the first passivation layer 140 and between the inorganic insulating material of the first passivation layer 140 and the organic insulating material of the second passivation layer 145, an adhesive property between the metallic material of the data line 130 and the organic insulating material of the second passivation layer 145 is improved due to the first passivation layer 140. The first passivation layer 140 may be omitted.

A common electrode 150, which has an island shape in each of the first to third regions A1, A2 and A3, is formed on the second passivation layer 145. Namely, the common electrode 150 in the second region A2 is separated from that in each of the first and third regions A1 and A3. The common electrode 150 has a plate shape. The common electrode 150 is formed of a transparent conductive material, for example, indium-tin-oxide (ITO) or indium-zinc-oxide (IZO).

An X direction sensing line Xsl and a Y direction sensing line Ysl are formed on the common electrode 150. The X direction sensing line Xsl overlaps the gate line 119 in the first and third regions A1 and A3, and the Y direction sensing line Ysl overlaps the data line 130 in the second region A2. The Y direction sensing line Ysl extends along the data line 130 such that the second regions A2 arranged along the data line 130 are electrically connected by the Y direction sensing line Ysl. The X direction sensing lines Xsl in the first and third regions A1 and A2 of each touch block TB (of FIG. 3) are electrically connected to each other through the connection line 152.

A third passivation layer 155 is formed on the X direction sensing line Xsl and the Y direction sensing line Ysl. The third passivation layer 155 may be formed of an inorganic insulating material, for example, silicon oxide or silicon nitride.

The first to third passivation layers 140, 145 and 155 are patterned to form a drain contact hole 157 exposing the drain electrode 136. In addition, the third passivation layer 155 is patterned to form first and second contact holes 158a and 159a respectively exposing the X sensing lines Xsl in the first and third regions A1 and A3. Furthermore, the first to third passivation layer 140, 145 and 155 and the interlayer insulating layer 123 are patterned to form third and fourth contact holes 158b and 159b respectively exposing ends of the connection line 152.

A pixel electrode 160 is formed on the third passivation layer 155. The pixel electrode 160 is disposed in each pixel region P and contacts the drain electrode 136 through the drain contact hole 157. The pixel electrode 160 is formed of a transparent conductive material, for example, ITO or IZO. The pixel electrode 160 has at least one opening op, which corresponds to the common electrode 150, such that a fringe field is generated between the pixel and common electrodes 160 and 150. The third passivation layer 155 is interposed between the pixel and common electrodes 160 and 150 such that a storage capacitor is formed.

In addition, first and second connection patterns 162 and 164 are formed on the third passivation layer 155. One end of the first connection pattern 162 contacts the X direction sensing line Xsl in the first region A1 through the first contact hole 158a, and the other end of the first connection pattern 162 contacts the connection line 152 through the third contact hole 158b. One end of the second connection pattern 164 contacts the X direction sensing line Xsl in the third region A3 through the second contact hole 159a, and the other end of the second connection pattern 164 contacts the connection line 152 through the fourth contact hole 159b. As a result, the X direction sensing line Xsl in the first region A1 is electrically connected to the X direction sensing line Xsl in the third region A3.

A second substrate 171 faces the first substrate 101. A black matrix 173 is formed on an inner side of the second substrate 171. The black matrix 173 corresponds to boundaries of the pixel region P and has a lattice shape. The black matrix 173 may further correspond to the TFT Tr. A color filter 175 is formed on the inner side of the second substrate 171 and corresponds to the pixel region P. The color filter 175 may include red, green and blue color filters.

In addition, an anti-static layer 183 is formed on an outer side of the second substrate 171. The anti-static layer 183 includes a conductive polymer, an ultraviolet (UV)-setting binder and transparent silica having a hydrophilic property. The anti-static layer 183 has a sheet resistance of several tens of Mega ohms per square ($\Omega$/sq) to several Giga ohms per square (Ω/sq) and a hardness above 6H. The hardness of the anti-static layer 183 is equal to or greater than that of an inorganic insulating material layer. In addition, the anti-static layer 183 has a thickness of about 500 to 5000 Å and a transmittance above 98%.

For example, the conductive polymer may include one of polyaniline, poly(3,4-ethylenedioxythiophene) (PEDOT), polyacetylene, polypyrrole, polythiophene, and polysulfurnitride. The UV-setting binder may include one of acrylate, urethane acrylate oligomer, and acrylate monomer.

The conductive polymer has a conductivity of about 102 s/cm to about 10-5 s/cm. Namely, the conductive polymer has a specific resistance of about 10-2 Ωcm to about 105 Ωcm. When only the conductive polymer having the above specific resistance is used for the anti-static layer, a static electricity is effectively discharged because the conductive polymer has enough conductivity. However, the device can not be operated by a touch sensing because the anti-static layer including only the conductive polymer has too low specific resistance.

In the present invention, since the anti-static layer 183 includes a conductive polymer, an ultraviolet (UV)-setting binder and transparent silica and has a sheet resistance of several tens of Mega ohms per square (Ω/sq) to several Giga ohms per square (Ω/sq), the anti-static layer 183 serves as an element for a touch sensing as well as a path for a static electricity.

Namely, since the anti-static layer 183 has a sheet resistance of several tens of Mega ohms per square (Ω/sq) to several Giga ohms per square (Ω/sq), the anti-static layer 183 serves as a path for a static electricity such that there is no damage on the device from the static electricity. In addition, since the anti-static layer 183 has a sheet resistance of several tens of Mega ohms per square (Ω/sq) to several Giga ohms per square (Ω/sq), a change of capacitance by a touch can be detected such that the device can be operated by a touch sensing type.

By providing a liquid crystal layer 190 between the first and second substrates 101 and 171 and a seal pattern (not shown) at edges of one of the first and second substrates 101 and 171, the touch sensing type FFS mode LCD device is obtained. An FFS mode LCD device, which includes the common electrode having a plate shape and the pixel electrode having an opening, is show by FIGS. 3 to 6. Alternatively, an IPS mode LCD device, which includes the common and pixel electrodes being alternately arranged with each other, is also available.

As mentioned above, the touch sensing type LCD device includes the anti-static layer 183, which includes a conductive polymer, an ultraviolet (UV)-setting binder and transparent silica having a hydrophilic property to have a sheet resistance of several tens of Mega ohms per square (Ω/sq) to several Giga ohms per square (Ω/sq), at an outer side of the second substrate 171. The anti-static layer 183 serves as a path for a static electricity and does not serve as an obstructer for touch sensing. Namely, the anti-static layer 183 serves as a dielectric layer between a finger and the common electrode 150 when the device is touched such that a capacitor is formed between the finger and the common electrode 150. As a result, a touch is detected by a change of capacitance between the finger and the common electrode 150.

In more detail, when one touch block TB (of FIG. 3) is touched, the anti-static layer 183, which has a sheet resistance of several tens of Mega ohms per square (Ω/sq) to several Giga ohms per square (Ω/sq), serves as a dielectric layer such that a capacitor is generated by the finger, the common electrode 150, the liquid crystal layer 190, the color filter layer 175, the second substrate 171, the anti-static layer 183, and so on. A change of capacitance of the capacitor is detected by the X direction sensing circuit (not shown) and the Y direction sensing circuit (not shown) through the X direction sensing line Xsl and the Y direction sensing line Ysl, which are respectively connected to the common electrode 150, such that a position of the touched touch block TB is sensed.

Since the static electricity has a voltage of several thousands to several hundreds of thousands, the anti-static layer 183, which has a sheet resistance of several tens of Mega ohms per square (Ω/sq) to several Giga ohms per square (Ω/sq), serves as a conductive path for the static electricity. However, since an electric current of the finger has a range within several nano-amperes to several micro-amperes, the anti-static layer 183, which has a sheet resistance of several tens Mega ohms per square (Ω/sq) to several Giga ohms per square (Ω/sq), serves as an insulating layer for the touch. Accordingly, the anti-static layer 183 serves as a dielectric layer of the capacitor for the touch. As a result, the device according to the present invention including a touch sensing part, i.e., the X direction sensing line Xsl and the Y direction sensing line Ysl, and the anti-static layer 183 can be operated by a touch sensing, and there is no damage from a static electricity.

In addition, since the anti-static layer 183 has hardness above 6H due to the UV-setting binder and transparent silica, there is no damage, e.g., a scratch, on the anti-static layer 183. When the anti-static layer is formed of the conductive polymer and the UV-setting binder without the transparent silica, the anti-static layer can have a maximum hardness of 5H due to a cross-linking of the binder. The damage, e.g., a scratch, during a modulation process for the device, can be prevented by the hardness of 5H. However, a scratch by a brush or a blade in a cleaning process for a polarizing plate can not be prevented by the hardness of 5H. Accordingly, in the present invention, the anti-static layer 183 includes transparent silica with the conductive polymer and the UV-setting binder to have a hardness being equal to or greater than 6H such that there is no damage on the anti-static layer 183 even during the cleaning process.

FIGS. 7A to 7G are cross-sectional view showing a fabricating process of a touch sensing type LCD device according to an embodiment of the present invention.

Figure 7A:
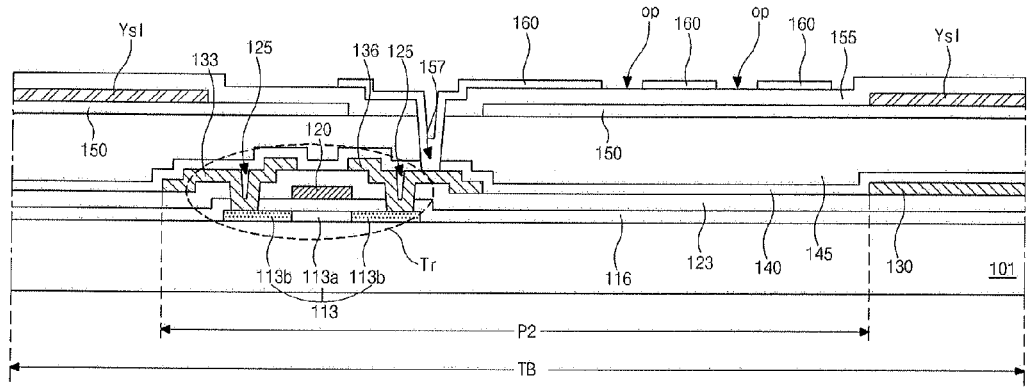
FIGS. 7A to 7G are cross-sectional view showing a fabricating process of a touch sensing type LCD device according to an embodiment of the present invention.

As shown in FIG. 7A, an array substrate is formed by following processes. An intrinsic amorphous silicon layer (not shown) is formed on the first substrate 101 by depositing intrinsic amorphous silicon. The amorphous silicon layer is crystallized by irradiating a laser beam or heating to form a polycrystalline silicon layer (not shown). The polycrystalline silicon layer is patterned by a mask process to form the semiconductor layer 113 in each pixel regions P1, P2 and P3. FIGS. 7A to 7G show the second pixel region P2 of the second region A2 (of FIG. 3) in one touch block TB.

Next, the gate insulating layer 116 is formed on the semiconductor layer 113 by depositing an inorganic insulating material such as silicon oxide and silicon nitride.

Next, a first metal layer (not shown) is formed on the gate insulating layer 116 by depositing one of aluminum (Al), Al alloy (AlNd), copper (Cu), Cu alloy and chromium (Cr). The first metal layer is patterned to form the gate electrode 120, the gate line 119 (of FIG. 4) and the connection line 152 (of FIG. 4). The gate electrode 120 corresponds to a center of the semiconductor layer 113 and extends from the gate line 119. The connection line 152 is spaced apart from and parallel to the gate line 119. The connection line 152 is disposed in the second region A2, and both ends of the connection line 152 protrude to the first and third regions A1 and A3 (of FIG. 3 or FIG. 4).

Next, impurities are doped into the semiconductor layer 113 using the gate electrode 120 as a blocking such that the impurities are doped into both sides of the semiconductor layer 113. As a result, a first semiconductor region 113a of a center of the semiconductor layer 113, which is formed of intrinsic polycrystalline silicon, serves as a channel, and second semiconductor regions 113b at both sides of the first semiconductor region 113a are doped by high-concentration impurities.

Next, the interlayer insulating layer 123 is formed on the gate line 119, the gate electrode 120 and the connection line 152 by depositing an inorganic insulating material, for example, silicon oxide or silicon nitride. The interlayer insulating layer 123 and the gate insulating layer 116 are patterned to form the semiconductor contact holes 125 exposing the second semiconductor regions 113b of the semiconductor layer 113.

Next, a second metal layer (not shown) is formed on the interlayer insulating layer 123 by depositing one of aluminum (Al), Al alloy (AlNd), copper (Cu), Cu alloy, chromium (Cr), and molybdenum (Mo). The second metal layer is patterned to form the data line 130, the source electrode 133 and the drain electrode 136. The source and drain electrodes 133 and 136 respectively contact the second semiconductor regions 113b through the semiconductor contact holes 125. The drain electrode 136 is spaced apart from the source electrode 133. The data line 130 extends from the source electrode 133 and crosses the gate line 119 to define the pixel regions P1, P2 and P3.

The semiconductor layer 113, the gate insulating layer 116, the gate electrode 120, the interlayer insulating layer 123, the source electrode 133 and the drain electrode 136 constitute the TFT Tr. This may be referred to as a top gate type TFT. Alternatively, a bottom gate type TFT, where a semiconductor layer is positioned between a gate electrode as a lower layer of the TFT and source and drain electrodes as a upper layer of the TFT, may be used. To form the bottom gate type TFT, a step of forming the gate electrode, the gate line and the connection line, a step of forming the gate insulating layer, a step of forming a semiconductor layer, which includes an active layer of intrinsic amorphous silicon and an ohmic contact layer of impurity-doped amorphous silicon, and a step of forming the data line, the source electrode and the drain electrode are sequentially processed.

Next, a first passivation layer 140 and a second passivation layer 145 are sequentially formed on the TFT Tr and the data line 130 by depositing an inorganic insulating material and coating an organic insulating material. The second passivation layer 145 has a flat top surface. The first passivation layer 140 for enhancing an adhesive property between a metallic material of the data line and the organic insulating material of the second passivation layer 145 may be omitted.

Next, a first transparent conductive material layer (not shown) is formed on the second passivation layer 145 by depositing a transparent conductive material, for example, ITO or IZO. The first transparent conductive material layer is patterned to form the common electrode 150. As mentioned above, the common electrode 150 has an island shape in each of the first to third regions A1, A2 and A3. Namely, the common electrode 150 in the second region A2 is separated from that in each of the first and third regions A1 and A3.

Next, a third metal layer (not shown) is formed on the common electrode 150 by depositing one of aluminum (Al), Al alloy (AlNd), copper (Cu) and Cu alloy. The third metal layer is patterned to form the X direction sensing line Xsl (of FIG. 4) and the Y direction sensing line Ysl. The X direction sensing line Xsl overlaps the gate line 119 in the first and third regions A1 and A3, and the Y direction sensing line Ysl overlaps the data line 130 in the second region A2. The Y direction sensing line Ysl extends along the data line 130 such that the second regions A2 arranged along the data line 130 are electrically connected by the Y direction sensing line Ysl. The X direction sensing lines Xsl in the first and third regions A1 and A2 of each touch block TB (of FIG. 3) are electrically connected to each other through the connection line 152.

Next, a third passivation layer 155 is formed on the X direction sensing line Xsl and the Y direction sensing line by depositing an inorganic insulating material, for example, silicon oxide or silicon nitride. The third passivation layer 155 is patterned to form first and second contact holes 158a and 159a respectively exposing the X sensing lines Xsl in the first and third regions A1 and A3. The first to third passivation layers 140, 145 and 155 are patterned to form a drain contact hole 157 exposing the drain electrode 136. The first to third passivation layer 140, 145 and 155 and the interlayer insulating layer 123 are patterned to form third and fourth contact holes 158b and 159b respectively exposing ends of the connection line 152.

Next, a second transparent conductive material layer (not shown) is formed on the third passivation layer 145 by depositing a transparent conductive material, for example, ITO or IZO. The second transparent conductive material layer is patterned to form the pixel electrode 160, and the first and second connection patterns 162 and 164. The pixel electrode 160 is disposed in each pixel region P and contacts the drain electrode 136 through the drain contact hole 157. The pixel electrode 160 has at least one opening op, which corresponds to the common electrode 150, such that a fringe field is generated between the pixel and common electrodes 160 and 150. One end of the first connection pattern 162 contacts the X direction sensing line Xsl in the first region A1 through the first contact hole 158a, and the other end of the first connection pattern 162 contacts the connection line 152 through the third contact hole 158b. One end of the second connection pattern 164 contacts the X direction sensing line Xsl in the third region A3 through the second contact hole 159a, and the other end of the second connection pattern 164 contacts the connection line 152 through the fourth contact hole 159b. As a result, the X direction sensing line Xsl in the first region A1 is electrically connected to the X direction sensing line Xsl in the third region A3.

Figure 7B:
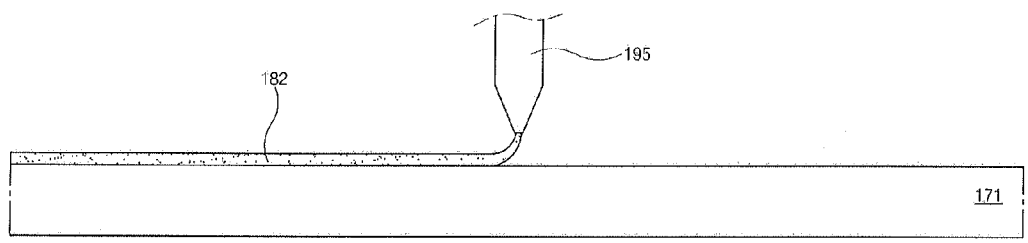

Next, as shown in FIG. 7B, a liquid phase polymer mixture including a conductive polymer, an ultraviolet (UV)-setting binder and transparent silica with a solvent is coated on an outer side of the second substrate 171 under a room temperature by a spin coating apparatus (not shown) or a slit coating apparatus 195 to form a polymer layer 182. The liquid phase polymer mixture may further include a multi-functional monomer, for example, trimethylolpropane triacrylate (TMPTA), which has a molecular weight of about 300 to 400, to increase an adhesive strength onto the substrate 171.

The conductive polymer, the UV-setting binder and transparent silica, which includes a hydrophilic functional group, for example, —SiOH, through a surface modification, are inserted into the solvent. The solvent has a relatively low boiling point to be cured under a relative low temperature less than 100° C. For example, the solvent may include one of isobutyl alcohol, isobutyl ketone, and methylethyl ketone. For example, a weight ratio of the conductive polymer to the UV-setting binder may be about 0.5:99.5 to about 10:90. The transparent silica may have a weight % of about 10 to about 20 with respect to the UV-setting binder. Namely, a weight ratio of the transparent silica to the UV-setting binder is about 10:90 to about 20:80. Since the transparent silica has a hydrophilic property, a clogging problem between silica molecules is prevented. Since the above solvent is a polar solvent also having a hydrophilic property, the transparent silica is uniformly dispersed such that hardness is uniformly increased.

The conductive polymer has a weight ratio less than 10% of the liquid phase polymer mixture such that the anti-static layer 183 has a sheet resistance of several tens Mega ohms per square ($\Omega$/sq) to several Giga ohms per square ($\Omega$/sq) and a transmittance being equal to or greater than a layer of indium-tin-oxide (ITO). Generally, when indium-tin-oxide or indium-zinc-oxide is used for an anti-static layer, the anti-static layer has a transmittance of 96.5%. In the present invention, since the anti-static layer 183 includes the conductive polymer less than 10 weight % and the transparent silica, the anti-static layer 183 has a transmittance above 96.5%.

The solvent with the conductive polymer, the UV-setting binder and the transparent silica is stirred for several minutes to several hours such that the conductive polymer, the UV-setting binder and the transparent silica are resolved and uniformly dispersed in the solvent. As mentioned above, to increase an adhesive layer onto the substrate 171, the multi-functional monomer, for example, trimethylolpropane triacrylate (TMPTA), may be added into the liquid phase polymer mixture with a weight % being equal to or smaller than 0.5 with respect to the UV-setting binder.

Figure 7C:
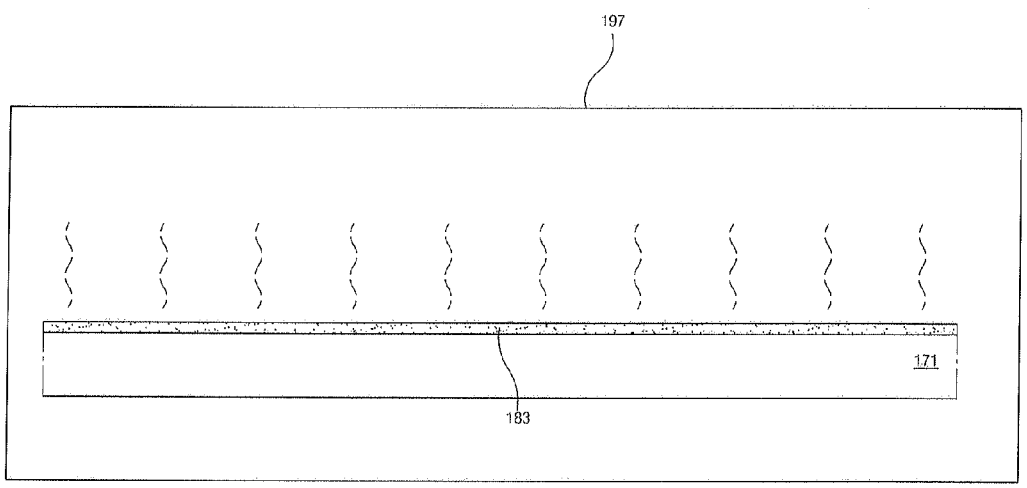

Next, as shown in FIG. 7C, the polymer layer 182 (of FIG. 7B) is dried by heating in a furnace or oven 197 to volatilize and remove the solvent. As a result, the anti-static layer 183 is formed on the outer side of the second substrate 171. As mentioned above, the anti-static layer 183 has a sheet resistance of several tens Mega ohms per square ($\Omega$/sq) to several Giga ohms per square ($\Omega$/sq). For example, the anti-static layer 183 has a thickness of about 500 to 5000 Å.

Figure 7D:
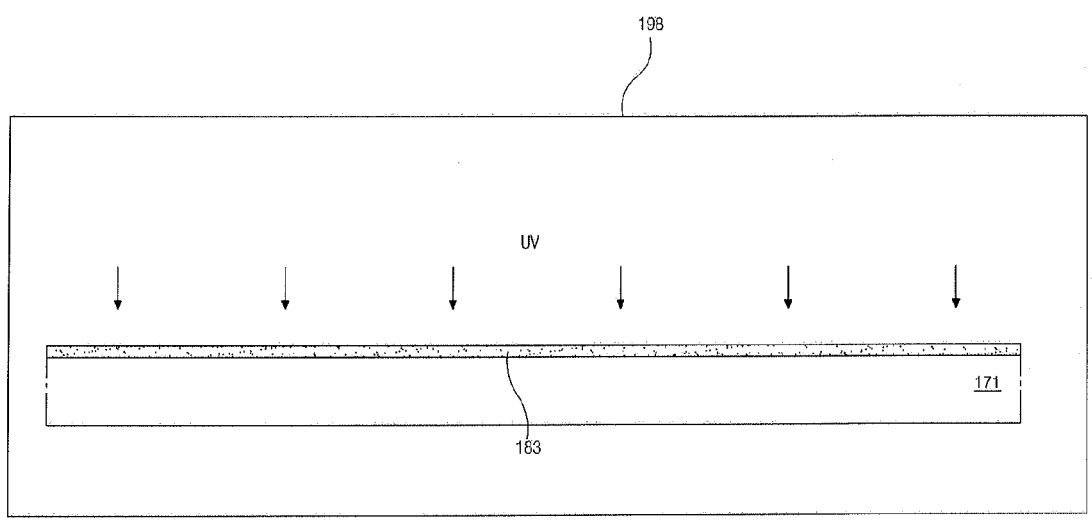

Next, as shown in FIG. 7D, a UV light is irradiated onto the anti-static layer 183 in a UV irradiating apparatus 198 to form a cross-linking in the anti-static layer 183 by the UV-setting binder. As a result, combination strength between the UV-setting binder and the conductive polymer in the anti-static layer 183 is enhanced and the transparent silica is interconnected with the cross-linking structure such that the anti-static layer 183 has hardness above 6H.

Figure 7E:
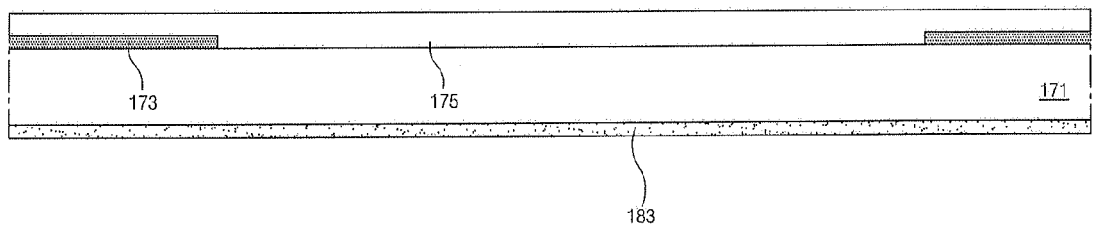

Next, as shown in FIG. 7E, a light blocking material, for example, a black resin, is coated on an inner side of the second substrate 171 and patterned by a mask process to form the black matrix 173. Next, the color filter 175 including the red, green and blue color filters is formed on the inner side of the second substrate 171. As a result, a color filter substrate is obtained. Although not shown, an overcoat layer for providing a flat top surface may be formed.

Figure 7F:
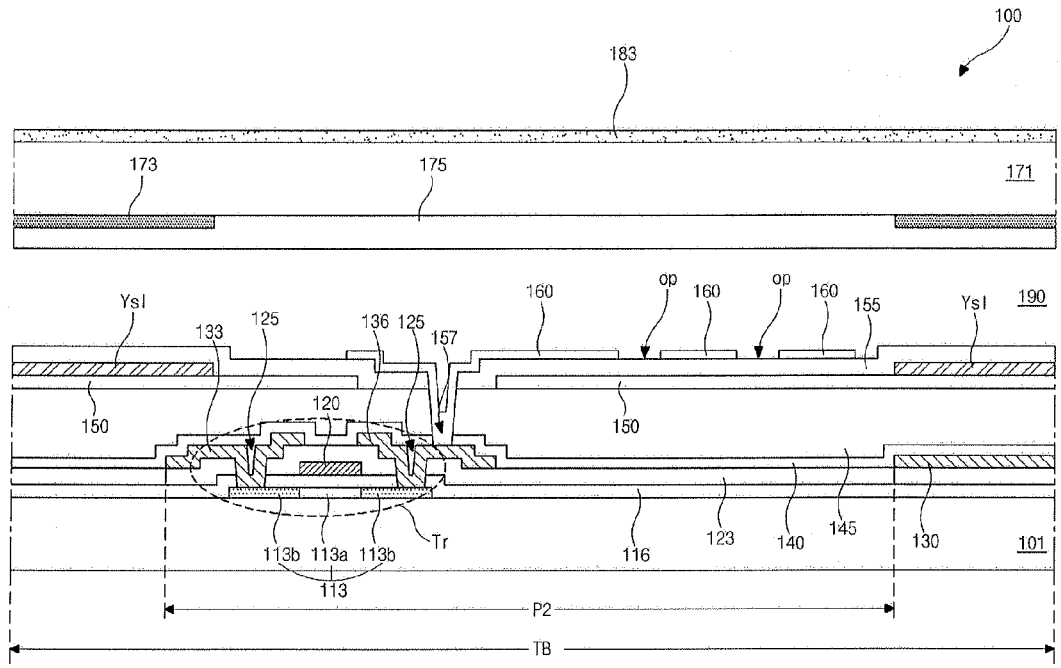

Next, as shown in FIG. 7F, the array substrate and the color filter substrate are disposed such that the color filter layer 175 faces the pixel electrode 160, and a seal pattern (not shown) is formed along edges of one of the array substrate and the color filter substrate. Next, the liquid crystal layer 190 is disposed between the array substrate and the color filter substrate, and the array substrate and the color filter substrate are attached to form a liquid crystal panel.

Figure 7G:
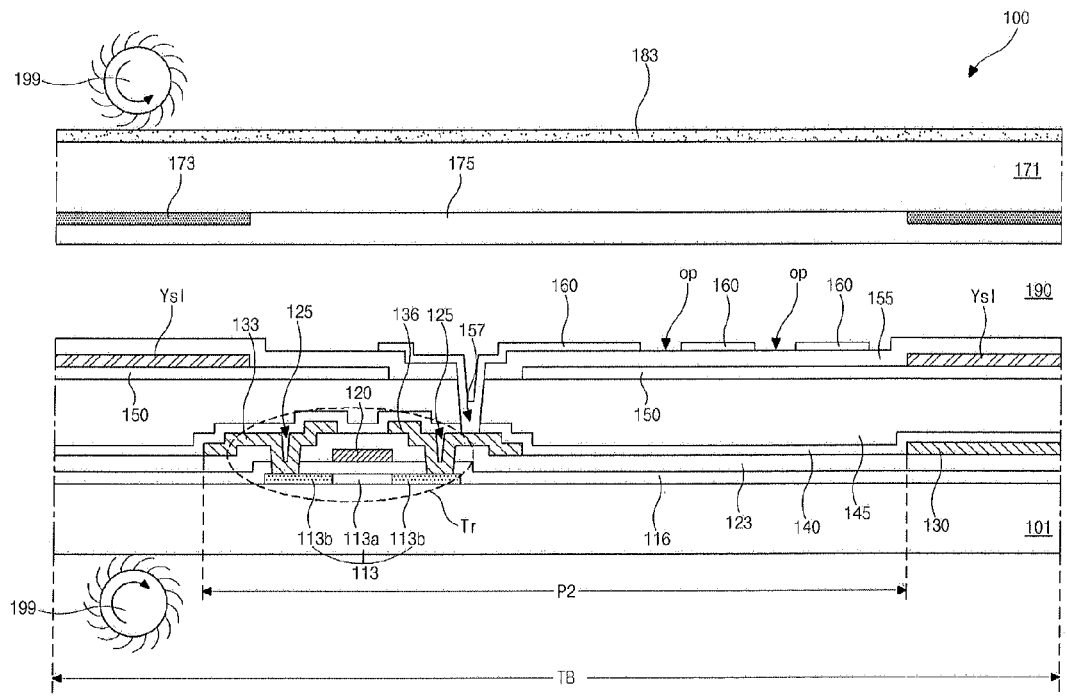

Next, as shown in FIG. 7G, a cleaning process using a brush 199 or a blade is performed onto surfaces of the liquid crystal panel 100 to remove particles on the surfaces of the liquid crystal panel 100. Since the anti-static layer 183 has hardness above 6H, there is no damage on the anti-static layer 183 by the brush 199 or blade. Next, first and second polarizing plates (not shown) are respectively formed on an outer side of the first substrate 101 and an outer side of the anti-static layer 183. Next, although not shown, the X direction sensing circuit and the Y direction sensing circuit, which are respectively connected to the X direction sensing line and the Y direction sensing line, and a driving circuit connected to the gate line 119 and the data line 130 are formed on the liquid crystal panel to obtain the device.

FIGS. 8A to 8G are cross-sectional view showing a fabricating process of a touch sensing type LCD device according to an embodiment of the present invention.

The process shown by FIGS. 8A to 8G has differences in a step of forming the anti-static layer and a step of etching the first and second substrates. Accordingly, below explanation is focused on the differences.

Figure 8A:
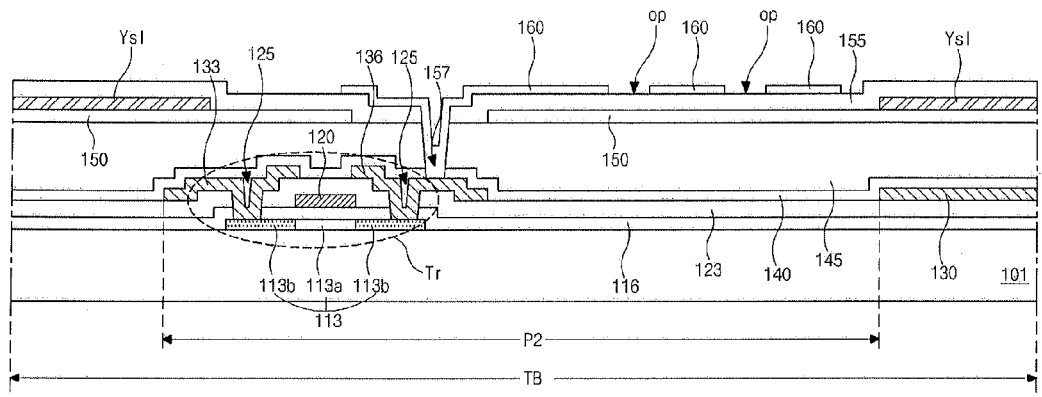
FIGS. 8A to 8G are cross-sectional view showing a fabricating process of a touch sensing type LCD device according to an embodiment of the present invention.

As shown in FIG. 8A, the array substrate is obtained by forming the TFT Tr, the gate line 119, the data line 130, the X direction sensing line Xsl, the Y direction sensing line Ysl, the common electrode 150, the pixel electrode 160, the connection line 152, the connection patterns 162 and 164, and so on.

Figure 8B:
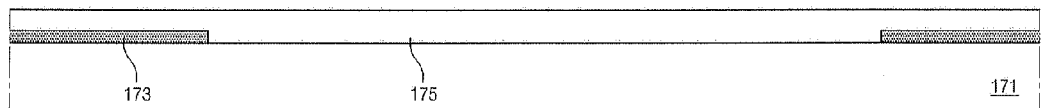

Next, as shown in FIG. 8B, the black matrix 173 and the color filter layer 175 are formed on an inner side of the second substrate 171. Although not shown, an overcoat layer may be formed on the color filter layer 175.

Figure 8C:
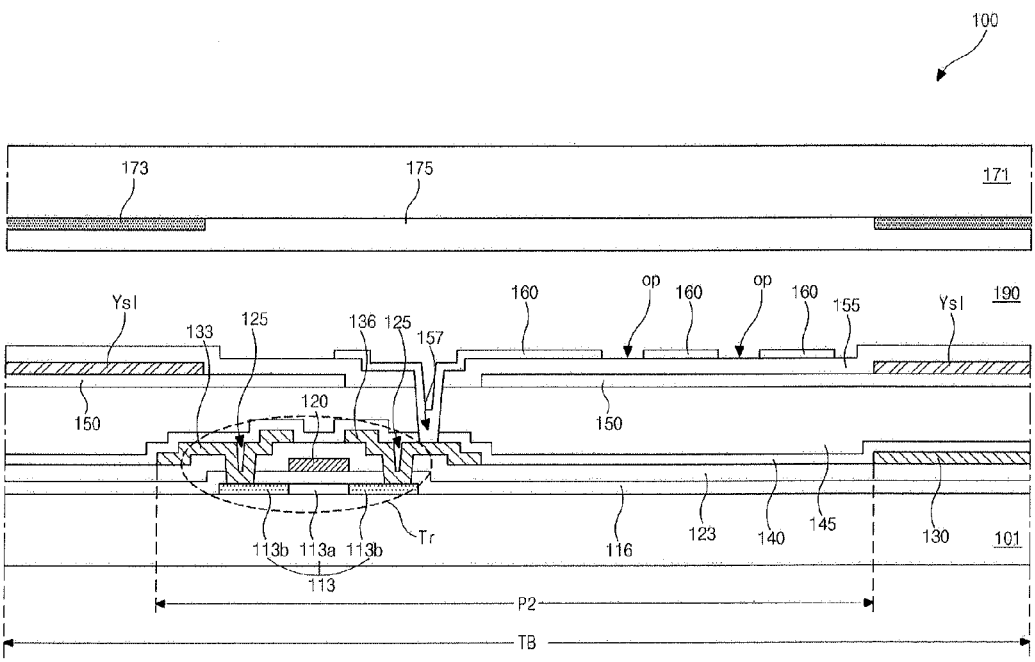

Next, as shown in FIG. 8C, the first substrate 101 and the second substrate 171 are disposed such that the color filter layer 175 faces the pixel electrode 160, and a seal pattern (not shown) is formed along edges of one of the first substrate 101 and the second substrate 171. Next, the liquid crystal layer 190 is disposed between the first substrate 101 and the second substrate 171, and first substrate 101 and the second substrate 171 are attached to form a liquid crystal panel.

Figure 8D:
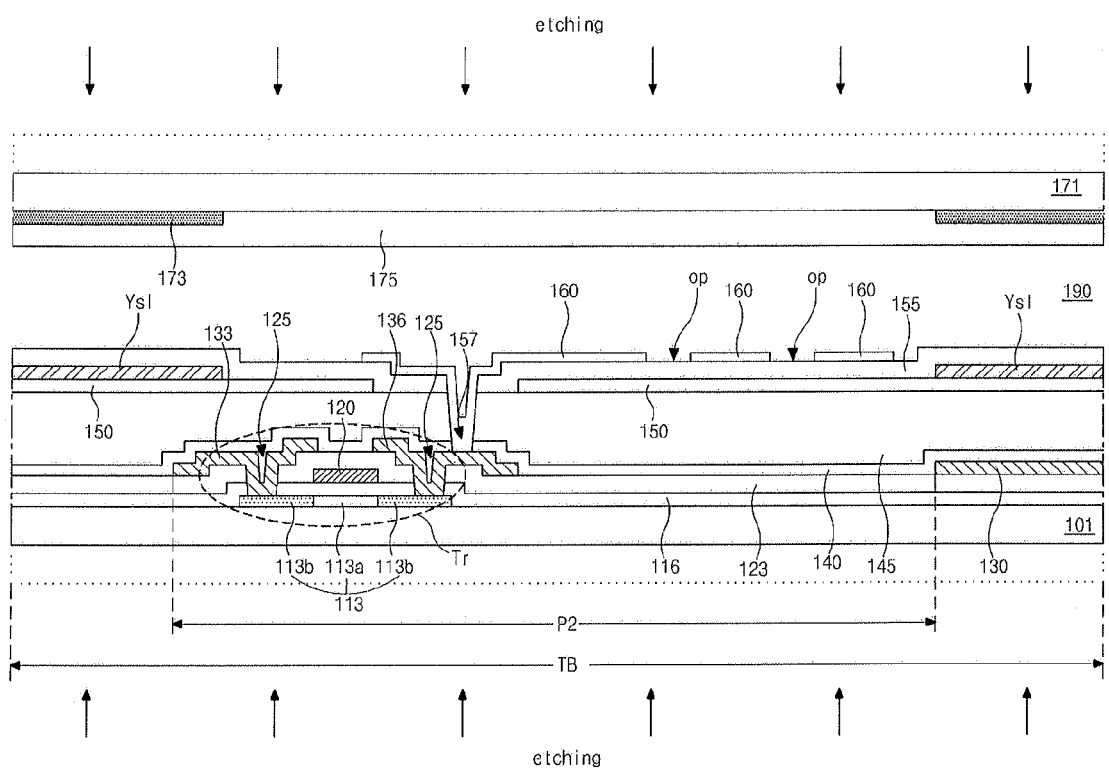

Next, as shown in FIG. 8D, the liquid crystal panel is exposed to an etchant, which is capable of etching glass of the first and second substrates 101 and 171, to reduce a thickness of each of the first and second substrates 101 and 171. Namely, a thickness of liquid crystal panel is reduced. For example, the etchant may include hydrofluoric acid (HF). A dipping process or a spray process may be used. As a result, light weight and thin profile LCD device can be obtained.

When the thickness of the first and second substrates 101 and 171 are reduced before forming elements, for example, the TFT Tr or the color filter layer 175, there may be crack or brokenness. Accordingly, as mentioned above, after forming the elements on the first and second substrates 101 and 171 having a thickness of about 0.5 to 0.7 mm, the etching process is performed to reduce the thickness of the first and second substrates 101 and 171. For example, the first and second substrates 101 and 171 may have a thickness of about 0.2 to 0.3 mm after the etching process.

Figure 8E:
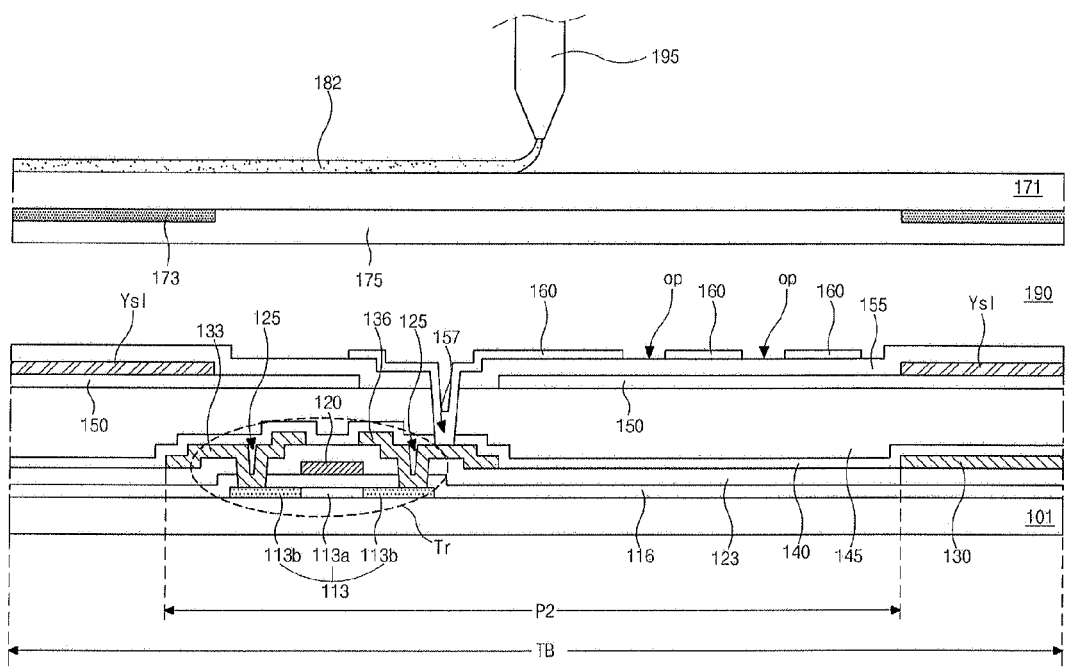

Next, as shown in FIG. 8E, a liquid phase polymer mixture including a conductive polymer, an ultraviolet (UV)-setting binder and transparent silica with a solvent is coated on an outer side of the second substrate 171 under a room temperature by a spin coating apparatus (not shown) or a slit coating apparatus 195 to form a polymer layer 182.

Figure 8F:
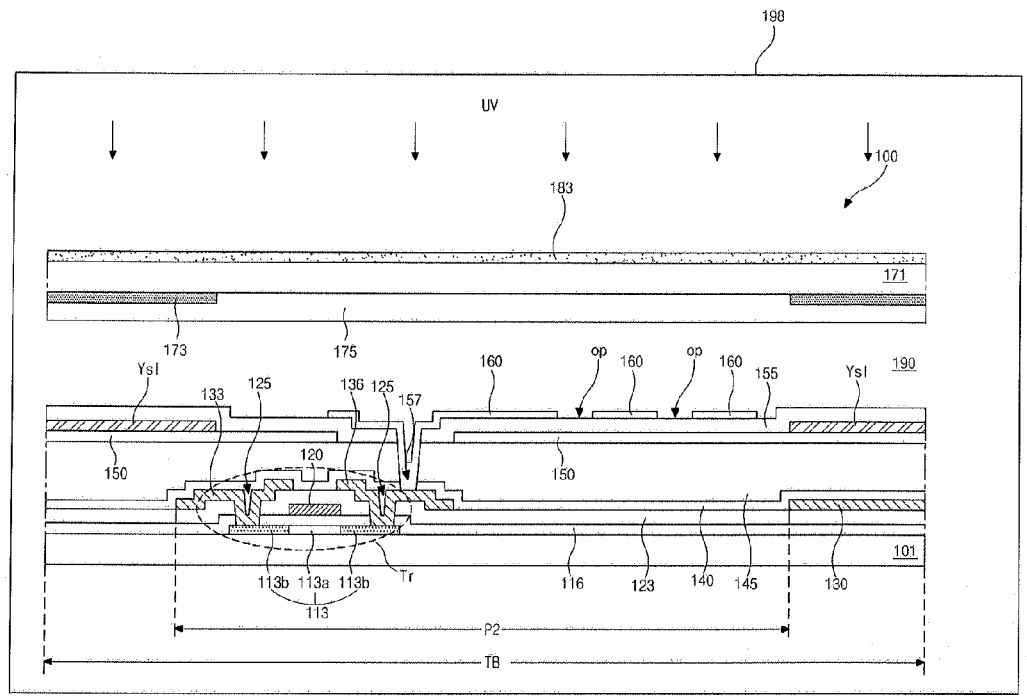

Next, as shown in FIG. 8F, the polymer layer 182 (of FIG. 8E) is dried by heating in a furnace or oven (not shown) to volatilize and remove the solvent. As a result, the anti-static layer 183 is formed on the outer side of the second substrate 171. As mentioned above, the anti-static layer 183 has a sheet resistance of several tens Mega ohms per square ($\Omega$/sq) to several Giga ohms per square ($\Omega$/sq). For example, the anti-static layer 183 has a thickness of about 500 to 5000 Å.

In this case, the heating process is performed under a temperature below 100° C., beneficially a temperature of 50 to 80° C. Because there is the liquid crystal layer 190 between the first and second substrates 101 and 171 when the heating process is performed, there are serious damages on the liquid crystal panel if the heating process is performed under a temperature above 100° C. For example, the seal pattern may be collapsed by an expansion of the liquid crystal layer 190.

Next, a UV light is irradiated onto the anti-static layer 183 in a UV irradiating apparatus 198 to form a cross-linking in the anti-static layer 183 by the UV-setting binder. As a result, combination strength between the UV-setting binder and the conductive polymer in the anti-static layer 183 is enhanced and the transparent silica is interconnected with the cross-linking structure such that the anti-static layer 183 has hardness above 6H.

Figure 8G:
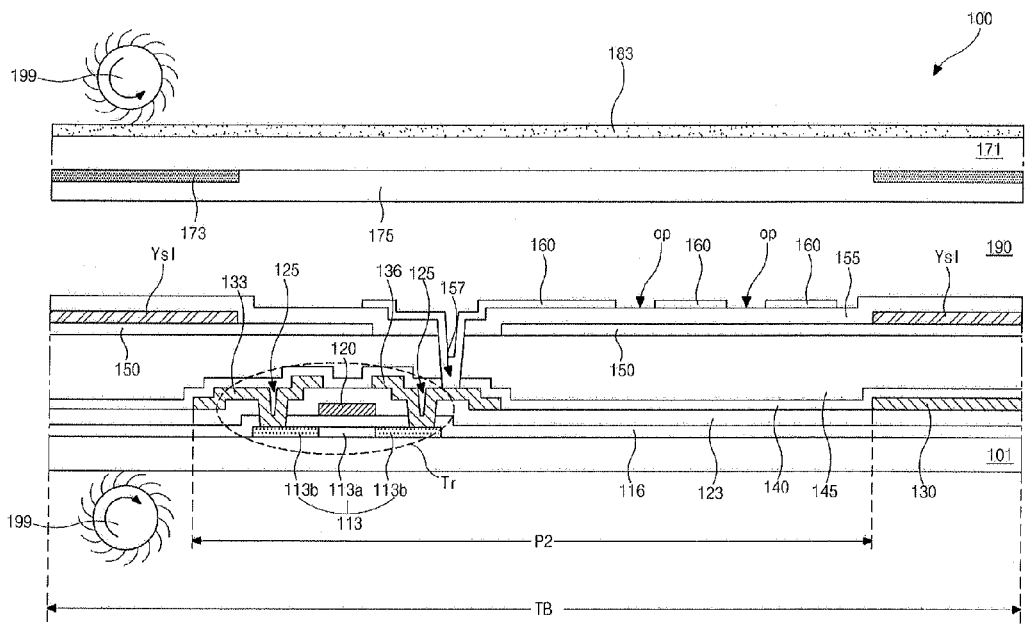

Next, as shown in FIG. 8G, a cleaning process using a brush 199 or a blade is performed onto surfaces of the liquid crystal panel 100 to remove particles on the surfaces of the liquid crystal panel 100. Since the anti-static layer 183 has hardness above 6H, there is no damage on the anti-static layer 183 by the brush 199 or blade. Next, first and second polarizing plates (not shown) are respectively formed on an outer side of the first substrate 101 and an outer side of the anti-static layer 183. Next, although not shown, the X direction sensing circuit and the Y direction sensing circuit, which are respectively connected to the X direction sensing line and the Y direction sensing line, and a driving circuit connected to the gate line 119 and the data line 130 are formed on the liquid crystal panel to obtain the device.

Figure 9:
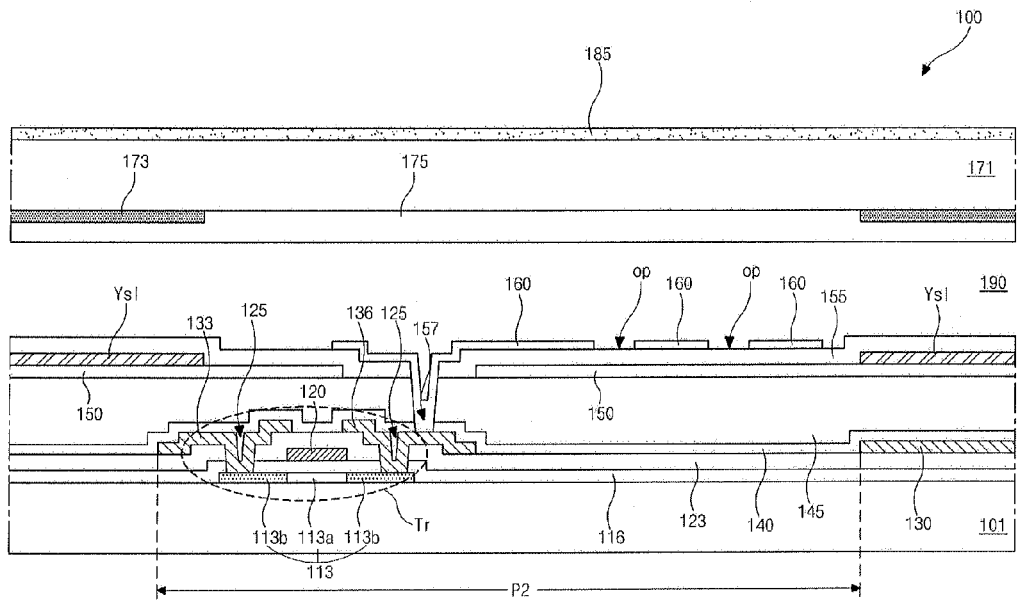
FIG. 9 is a cross-sectional view showing a portion of a touch sensing type LCD according to the present invention and taken along the line V-V of FIG. 4.

FIG. 9 is a cross-sectional view showing a portion of a touch sensing type LCD according to the present invention and taken along the line V-V of FIG. 4. The device shown by FIG. 9 has a difference in an anti-static layer with the device shown by FIGS. 5 and 6.

Referring to FIG. 9 with FIGS. 3 and 6, a gate line 119 and a data line 130 are formed on a first substrate 101. The gate and data lines 119 and 130 cross each other to define first to third pixel regions P1, P2 and P3. The first to third pixel regions P1, P2, P3 are respectively included to the first to third regions A1, A2 and A3.

In each pixel region P, a thin film transistor (TFT) Tr including a semiconductor layer 113, a gate electrode 120, a source electrode 133 and a drain electrode 136 is formed. The gate electrode 120 and the source electrode 133 respectively extend from the gate line 119 and the data line 130 such that the TFT Tr is electrically connected to the gate line 119 and the data line 130.

The semiconductor layer 113 is formed of polycrystalline silicon. A first semiconductor region 113a of a center of the semiconductor layer 113, which is formed of intrinsic polycrystalline silicon, serves as a channel, and second semiconductor regions 113b at both sides of the first semiconductor region 113a are doped by high-concentration impurities. A gate insulating layer 116 is formed on the semiconductor layer 113.

The gate electrode 120 is formed on the gate insulating layer 116 and corresponding to the first semiconductor region 113a. The gate line 119 is formed on the gate insulating layer 116 and connected to the gate electrode 120. A connection line 152 is also formed on the gate insulating layer 116 and parallel to the gate line 119. The connection line 152 is spaced apart from the gate line. The connection line 152 is disposed in the second pixel region P2 of the second region A2, and both ends of the connection line 152 are respectively disposed in the first pixel region P1 of the first region A1 and the third pixel region P3 of the third region A3.

An interlayer insulating layer 123 is formed on the gate line 119, the gate electrode 120 and the connection line 152. For example, the interlayer insulating layer 123 may be formed of an inorganic insulating material, for example, silicon oxide or silicon nitride. The interlayer insulating layer 123 and the gate insulating layer 116 are patterned to form semiconductor contact holes 125 exposing the second semiconductor regions 113b of the semiconductor layer 113.

On the interlayer insulating layer 123, the data line 130 is formed to cross the gate line 119. In addition, the source electrode 133 and the drain electrode 136 are formed on the interlayer insulating layer 123. The source and drain electrodes 133 and 136 respectively contact the second semiconductor regions 113b through the semiconductor contact holes 125.

As mentioned above, the semiconductor layer 113, the gate insulating layer 116, the gate electrode 120, the interlayer insulating layer 123, the source electrode 133 and the drain electrode 136 constitute the TFT Tr. This may be referred to as a top gate type TFT. Alternatively, a bottom gate type TFT, where a semiconductor layer is positioned between a gate electrode as a lower layer of the TFT and source and drain electrodes as a upper layer of the TFT, may be used.

A first passivation layer 140, which is formed of an inorganic insulating material, for example, silicon oxide or silicon nitride, and a second passivation layer 145, which is formed of an organic insulating material, for example, photoacryl or benzocyclobutene (BCB), are stacked on the data line 130, the source electrode 133 and the drain electrode 136. The second passivation layer 145 may have a thickness about 2 to 4 micrometers to provide a flat top surface. Since an adhesive strength between a metallic material of the data line 130 and the organic insulating material of the second passivation layer 145 is smaller than an adhesive strength between a metallic material of the data line 130 and the inorganic insulating material of the first passivation layer 140 and between the inorganic insulating material of the first passivation layer 140 and the organic insulating material of the second passivation layer 145, an adhesive property between the metallic material of the data line 130 and the organic insulating material of the second passivation layer 145 is improved due to the first passivation layer 140. The first passivation layer 140 may be omitted.

A common electrode 150, which has an island shape in each of the first to third regions A1, A2 and A3, is formed on the second passivation layer 145. Namely, the common electrode 150 in the second region A2 is separated from that in each of the first and third regions A1 and A3. The common electrode 150 has a plate shape. The common electrode 150 is formed of a transparent conductive material, for example, indium-tin-oxide (ITO) or indium-zinc-oxide (IZO).

An X direction sensing line Xsl and a Y direction sensing line Ysl are formed on the common electrode 150. The X direction sensing line Xsl overlaps the gate line 119 in the first and third regions A1 and A3, and the Y direction sensing line Ysl overlaps the data line 130 in the second region A2. The Y direction sensing line Ysl extends along the data line 130 such that the second regions A2 arranged along the data line 130 are electrically connected by the Y direction sensing line Ysl. The X direction sensing lines Xsl in the first and third regions A1 and A2 of each touch block TB (of FIG. 3) are electrically connected to each other through the connection line 152.

A third passivation layer 155 is formed on the X direction sensing line Xsl and the Y direction sensing line Ysl. The third passivation layer 155 may be formed of an inorganic insulating material, for example, silicon oxide or silicon nitride.

The first to third passivation layers 140, 145 and 155 are patterned to form a drain contact hole 157 exposing the drain electrode 136. In addition, the third passivation layer 155 is patterned to form first and second contact holes 158a and 159a respectively exposing the X sensing lines Xsl in the first and third regions A1 and A3. Furthermore, the first to third passivation layer 140, 145 and 155 and the interlayer insulating layer 123 are patterned to form third and fourth contact holes 158b and 159b respectively exposing ends of the connection line 152.

A pixel electrode 160 is formed on the third passivation layer 155. The pixel electrode 160 is disposed in each pixel region P and contacts the drain electrode 136 through the drain contact hole 157. The pixel electrode 160 is formed of a transparent conductive material, for example, ITO or IZO. The pixel electrode 160 has at least one opening op, which corresponds to the common electrode 150, such that a fringe field is generated between the pixel and common electrodes 160 and 150. The third passivation layer 155 is interposed between the pixel and common electrodes 160 and 150 such that a storage capacitor is formed.

In addition, first and second connection patterns 162 and 164 are formed on the third passivation layer 155. One end of the first connection pattern 162 contacts the X direction sensing line Xsl in the first region A1 through the first contact hole 158a, and the other end of the first connection pattern 162 contacts the connection line 152 through the third contact hole 158b. One end of the second connection pattern 164 contacts the X direction sensing line Xsl in the third region A3 through the second contact hole 159a, and the other end of the second connection pattern 164 contacts the connection line 152 through the fourth contact hole 159b. As a result, the X direction sensing line Xsl in the first region A1 is electrically connected to the X direction sensing line Xsl in the third region A3.

A second substrate 171 faces the first substrate 101. A black matrix 173 is formed on an inner side of the second substrate 171. The black matrix 173 corresponds to boundaries of the pixel region P and has a lattice shape. The black matrix 173 may further correspond to the TFT Tr. A color filter 175 is formed on the inner side of the second substrate 171 and corresponds to the pixel region P. The color filter 175 may include red, green and blue color filters.

In addition, an anti-static layer 185 is formed on an outer side of the second substrate 171. The anti-static layer 185 includes one of a conductive polymer and a conductive inorganic material and a thermo-setting binder being cured under a relatively low temperature below 100° C. The anti-static layer 183 has a sheet resistance of several tens Mega ohms per square (Ω/sq) to several hundreds Mega ohms per square (Ω/sq) and hardness of 7 to 9H.

For example, the conductive polymer may include one of polyaniline, poly(3,4-ethylenedioxythiophene) (PEDOT), polyacetylene, polypyrrole, polythiophene, and polysulfurnitride. The conductive inorganic material may include one of indium-tin-oxide (ITO), indium-zinc-oxide (IZO) and tin oxide (TiO2).

The thermo-setting binder includes silsesquioxane, which is shown in following formula 1, as a silane-based monomer and is cured under a relatively low temperature below 100° C. such that the anti-static layer 185 has hardness of 7 to 9H. For example, the thermo-setting binder may include one of tetraehoxysilane (TEOS) and tetramethoxysilane (TMOS).

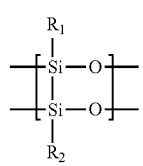

[Formula 1]

The silsesquioxane is substituted by at least one of phenyl, acrylate, ethoxy and methoxy such that the thermo-setting binder is cured at a relatively low temperature, for example, below 100° C., and has hardness of 7 to 9 H. For example, when both R1 and R2 in the above formula 1 are substituted by ethoxy, the thermo-setting binder is TEOS. When when both R1 and R2 in the above formula 1 are substituted by methoxy, the thermo-setting binder is TMOS. Both TEOS and TMOS are volatilized under a temperature about 39° C. such that the anti-static layer 185 including the above thermo-setting binder is cured under a temperature below about 100° C. In addition, since the thermo-setting binder includes silicon molecules, an adhesive property with the second substrate 171 of glass is increased.

On the other hand, the conductive polymer has a conductivity of about 102 s/cm to about 10-5 s/cm. Namely, the conductive polymer has a specific resistance of about 10-2 Ωcm to about 105 Ωcm. In addition, the conductive inorganic material has a sheet resistance of 500 to 1000 Ω/sq.

When only the conductive polymer, which has a specific resistance of about 10-20 Ωcm to about 105 Ωcm, or the conductive inorganic material, which has a sheet resistance of 500 to 1000 Ω/sq, is used for the anti-static layer, a static electricity is effectively discharged because the conductive polymer has enough conductivity. However, the device can not be operated by a touch sensing because the anti-static layer including only the conductive polymer has too low specific resistance.

In the present invention, since the anti-static layer 185 includes the conductive polymer or the conductive inorganic material with the thermo-setting binder to have a sheet resistance of several tens Mega ohms per square (Ω/sq) to several hundreds Mega ohms per square (Ω/sq), the anti-static layer 185 serves as an element for a touch sensing as well as a path for a static electricity. In addition, the anti-static layer 185 is cured under a temperature below 100° C. due to the thermo-setting binder and has hardness of 7 to 9H greater than 6H of hardness of an inorganic insulating material layer. As mentioned above, the anti-static layer 185 has a thickness of about 500 to 5000 Å and a transmittance above 98%.

Namely, since the anti-static layer 185 has a sheet resistance of several tens Mega ohms per square (Ω/sq) to several hundreds Mega ohms per square (Ω/sq), the anti-static layer 185 serves as a path for a static electricity such that there is no damage on the device from the static electricity. In addition, since the anti-static layer 185 has a sheet resistance of several tens Mega ohms per square (Ω/sq) to several hundreds Mega ohms per square (Ω/sq), a change of capacitance by a touch can be detected such that the device can be operated by a touch sensing type.

By providing a liquid crystal layer 190 between the first and second substrates 101 and 171 and a seal pattern (not shown) at edges of one of the first and second substrates 101 and 171, the touch sensing type FFS mode LCD device is obtained. An FFS mode LCD device, which includes the common electrode having a plate shape and the pixel electrode having an opening, is show by FIGS. 3, 6 and 9. Alternatively, an IPS mode LCD device, which includes the common and pixel electrodes being alternately arranged with each other, is also available.

As mentioned above, the touch sensing type LCD device includes the anti-static layer 185, which includes one of a conductive polymer and a conductive inorganic material and a thermo-setting binder to have a sheet resistance of several tens Mega ohms per square (Ω/sq) to several hundreds Mega ohms per square (Ω/sq), at an outer side of the second substrate 171. The anti-static layer 185 serves as a path for a static electricity and does not serve as an obstructer for touch sensing. Namely, the anti-static layer 185 serves as a dielectric layer between a finger and the common electrode 150 when the device is touched such that a capacitor is formed between the finger and the common electrode 150. As a result, a touch is detected by a change of capacitance between the finger and the common electrode 150.

In more detail, when one touch block TB (of FIG. 3) is touched, the anti-static layer 185, which has a sheet resistance of several tens Mega ohms per square (Ω/sq) to several hundreds Mega ohms per square (Ω/sq), serves as a dielectric layer such that a capacitor is generated by the finger, the common electrode 150, the liquid crystal layer 190, the color filter layer 175, the second substrate 171, the anti-static layer 185, and so on. A change of capacitance of the capacitor is detected by the X direction sensing circuit (not shown) and the Y direction sensing circuit (not shown) through the X direction sensing line Xsl and the Y direction sensing line Ysl, which are respectively connected to the common electrode 150, such that a position of the touched touch block TB is sensed.

Since the static electricity has a voltage of several thousands to several hundreds of thousands, the anti-static layer 185, which has a sheet resistance of several tens Mega ohms per square (Ω/sq) to several hundreds Mega ohms per square (Ω/sq), serves as a conductive path for the static electricity. However, since an electric current of the finger has a range within several nano-amperes to several micro-amperes, the anti-static layer 185, which has a sheet resistance of several tens Mega ohms per square (Ω/sq) to several hundreds Mega ohms per square (Ω/sq), serves as an insulating layer for the touch. Accordingly, the anti-static layer 185 serves as a dielectric layer of the capacitor for the touch. As a result, the device according to the present invention including a touch sensing part, i.e., the X direction sensing line Xsl and the Y direction sensing line Ysl, and the anti-static layer 185 can be operated by a touch sensing, and there is no damage from a static electricity.

In addition, since the anti-static layer 185 has hardness of 7 to 9H due to the thermo-setting binder, which is cured under a low temperature, there is no damage, e.g., a scratch, on the anti-static layer 183. Namely, there is no damage, e.g., a scratch, on the anti-static layer 183 even during the cleaning process using by a brush or a blade for a polarizing plate. Furthermore, since the thermo-setting binder includes silicon molecules, an adhesive property with the second substrate 171 of glass is increased.

FIGS. 10A to 10F are cross-sectional view showing a fabricating process of a touch sensing type LCD device according to an embodiment of the present invention. The process shown by FIGS. 10A to 10F has a difference in a step of forming the anti-static layer from the process shown by FIGS. 7A to 7G. Accordingly, below explanation is focused on the difference.

Figure 10A:
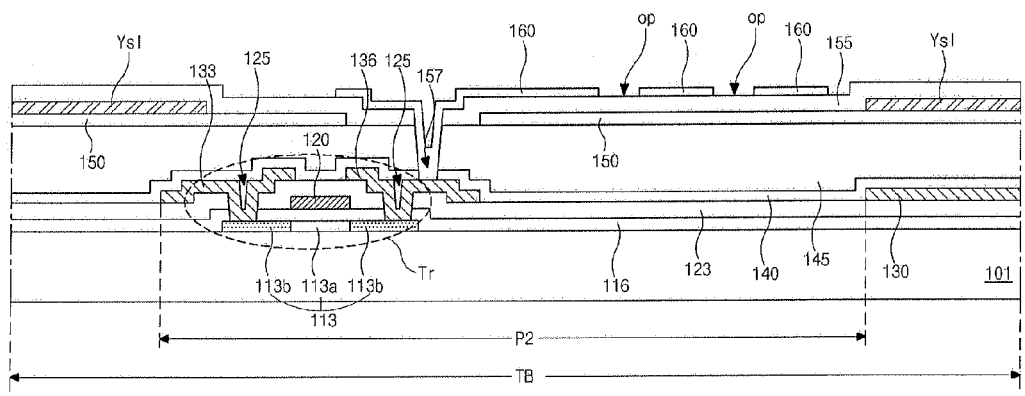
FIGS. 10A to 10F are cross-sectional view showing a fabricating process of a touch sensing type LCD device according to an embodiment of the present invention.

As shown in FIG. 10A, the array substrate is obtained by forming the TFT Tr, the gate line 119, the data line 130, the X direction sensing line Xsl, the Y direction sensing line Ysl, the common electrode 150, the pixel electrode 160, the connection line 152, the connection patterns 162 and 164, and so on.

Figure 10B:
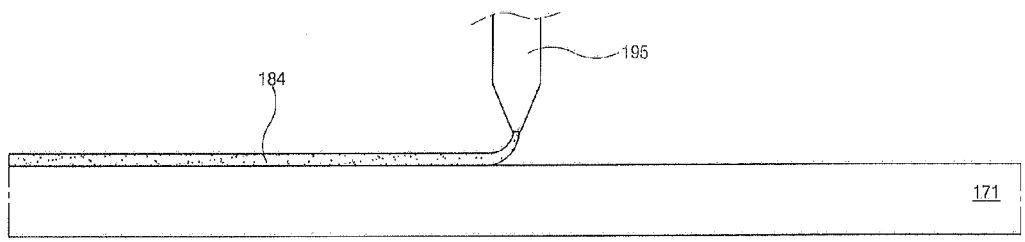

Next, as shown in FIG. 10B, a liquid phase mixture including one of a conductive polymer and a conductive inorganic material and a thermo-setting binder with a solvent is coated on an outer side of the second substrate 171 under a room temperature by a spin coating apparatus (not shown) or a slit coating apparatus 195 to form a anti-static material layer 184.

The conductive polymer or the conductive inorganic material and the thermo-setting binder are inserted into the solvent. The solvent has a relatively low boiling point to be cured under a relative low temperature less than 100° C. For example, the solvent may include one of isobutyl alcohol, isobutyl ketone, and methylethyl ketone. As mentioned above, the conductive polymer may include one of polyaniline, poly(3,4-ethylenedioxythiophene) (PEDOT), polyacetylene, polypyrrole, polythiophene, and polysulfurnitride. The conductive inorganic material may include one of indium-tin-oxide (ITO), indium-zinc-oxide (IZO) and tin oxide (TiO2). The thermo-setting binder may include one of tetraehoxysilane (TEOS) and tetramethoxysilane (TMOS). For example, a weight ratio of the conductive polymer or the conductive inorganic material to the thermo-setting binder may be about 0.5:99.5 to about 10:90.

The conductive polymer or the conductive inorganic material has a weight ratio less than 10% with respect to the thermo-setting binder such that the anti-static layer 185 has a sheet resistance of several tens Mega ohms per square (Ω/sq) to several hundreds Mega ohms per square (Ω/sq) and a transmittance being equal to or greater than a layer of indium-tin-oxide (ITO). Generally, when indium-tin-oxide or indium-zinc-oxide is used for an anti-static layer, the anti-static layer has a transmittance of 96.5%. In the present invention, since the anti-static layer 185 includes the conductive polymer or the conductive inorganic material less than 10 weight %, the anti-static layer 185 has a transmittance above 98%.

The solvent with the conductive polymer or the conductive inorganic material and the thermo-setting binder is stirred for several minutes to several hours such that the conductive polymer or the conductive inorganic material and the thermo-setting binder are resolved and uniformly dispersed in the solvent.

Figure 10C:
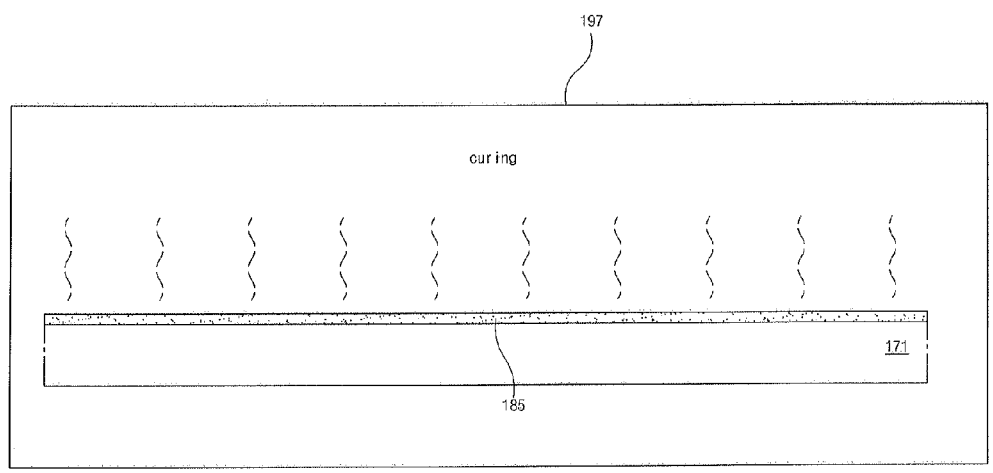

Next, as shown in FIG. 10C, the anti-static material layer 184 (of FIG. 10B) is dried and cured by heating in a furnace or oven 197 under a temperature below 100° C. to volatilize and remove the solvent and generate a cross-linking structure therein. As a result, the anti-static layer 185 is formed on the outer side of the second substrate 171. As mentioned above, the anti-static layer 185 has a sheet resistance of several tens Mega ohms per square (Ω/sq) to several hundreds Mega ohms per square (Ω/sq), a transmittance above 98%, hardness of 7H to 9H. For example, the anti-static layer 185 has a thickness of about 500 to 5000 Å. In addition, since the thermo-setting binder includes silicon molecules, an adhesive property with the second substrate 171 is increased.

Figure 10D:
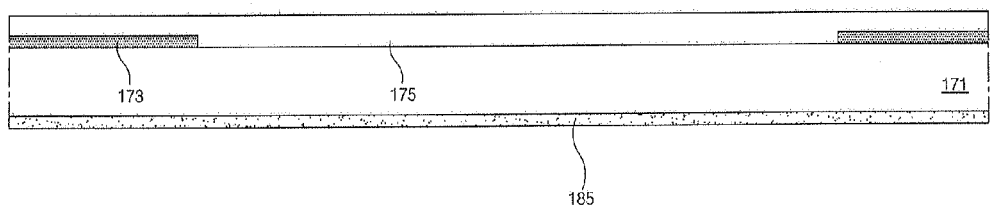

Next, as shown in FIG. 10D, a light blocking material, for example, a black resin, is coated on an inner side of the second substrate 171 and patterned by a mask process to form the black matrix 173. Next, the color filter 175 including the red, green and blue color filters is formed on the inner side of the second substrate 171. As a result, a color filter substrate is obtained. Although not shown, an overcoat layer for providing a flat top surface may be formed.

Figure 10E:
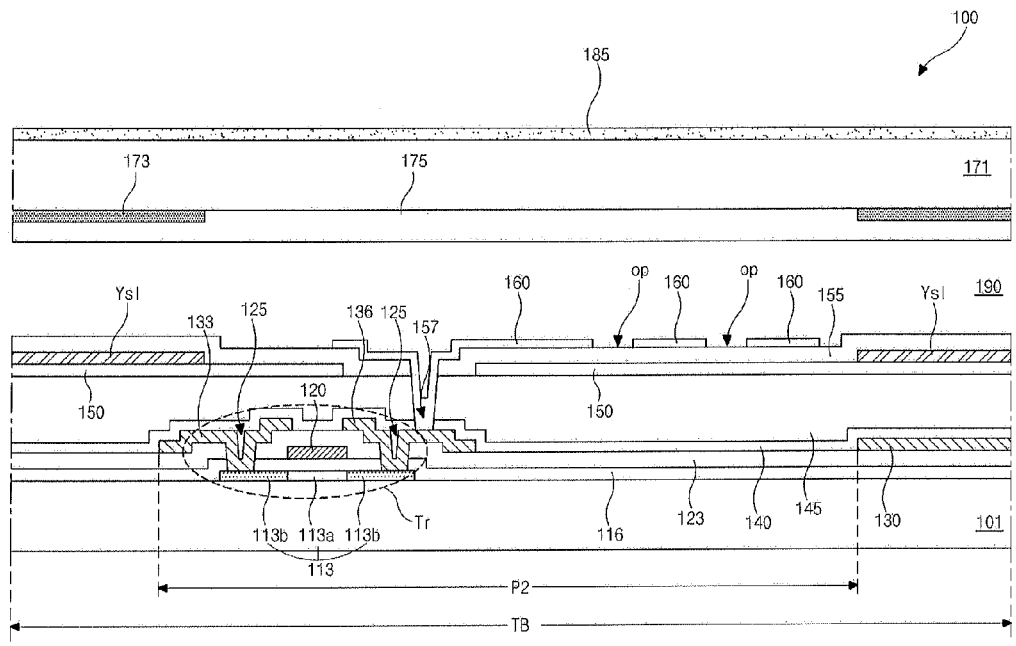

Next, as shown in FIG. 10E, the array substrate and the color filter substrate are disposed such that the color filter layer 175 faces the pixel electrode 160, and a seal pattern (not shown) is formed along edges of one of the array substrate and the color filter substrate. Next, the liquid crystal layer 190 is disposed between the array substrate and the color filter substrate, and the array substrate and the color filter substrate are attached to form a liquid crystal panel.

Figure 10F:
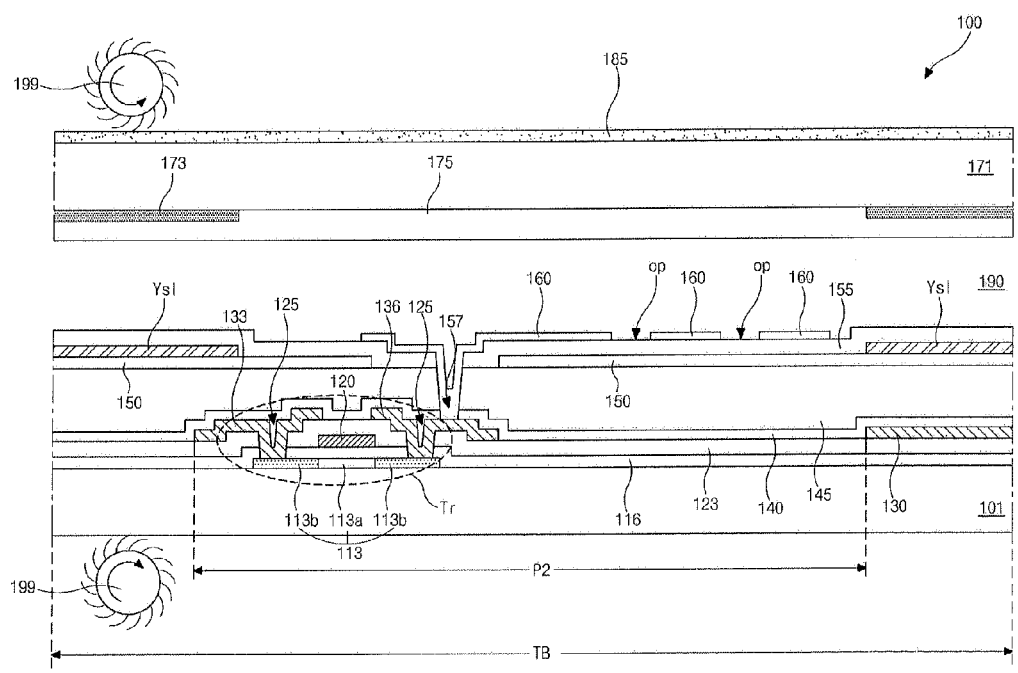

Next, as shown in FIG. 10F, a cleaning process using a brush 199 or a blade is performed onto surfaces of the liquid crystal panel 100 to remove particles on the surfaces of the liquid crystal panel 100. Since the anti-static layer 185 has hardness of 7H to 9H, there is no damage on the anti-static layer 185 by the brush 199 or blade. Next, first and second polarizing plates (not shown) are respectively formed on an outer side of the first substrate 101 and an outer side of the anti-static layer 185. Next, although not shown, the X direction sensing circuit and the Y direction sensing circuit, which are respectively connected to the X direction sensing line and the Y direction sensing line, and a driving circuit connected to the gate line 119 and the data line 130 are formed on the liquid crystal panel to obtain the device.

FIGS. 11A to 11G are cross-sectional view showing a fabricating process of a touch sensing type LCD device according to an embodiment of the present invention.

The process shown by FIGS. 11A to 11G has differences in a step of forming the anti-static layer and a step of etching the first and second substrates from the process shown by FIGS. 10A to 10F. Accordingly, below explanation is focused on the differences.

Figure 11A:
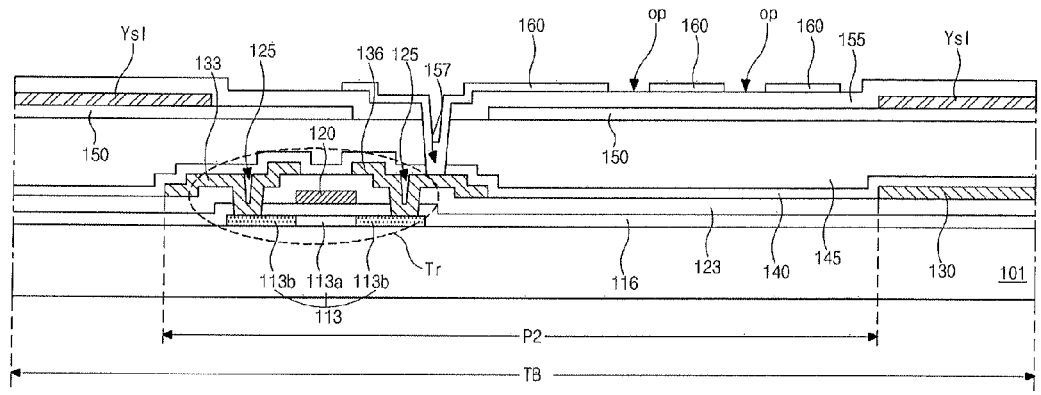
FIGS. 11A to 11G are cross-sectional view showing a fabricating process of a touch sensing type LCD device according to an embodiment of the present invention.

As shown in FIG. 11A, the array substrate is obtained by forming the TFT Tr, the gate line 119, the data line 130, the X direction sensing line Xsl, the Y direction sensing line Ysl, the common electrode 150, the pixel electrode 160, the connection line 152, the connection patterns 162 and 164, and so on.

Figure 11B:
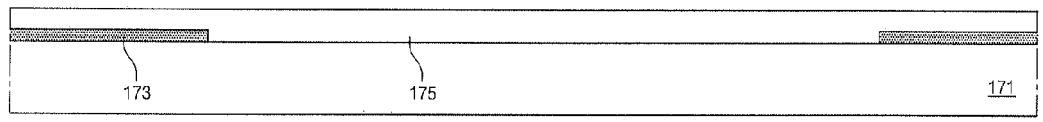

Next, as shown in FIG. 11B, the black matrix 173 and the color filter layer 175 are formed on an inner side of the second substrate 171. Although not shown, an overcoat layer may be formed on the color filter layer 175.

Figure 11C:
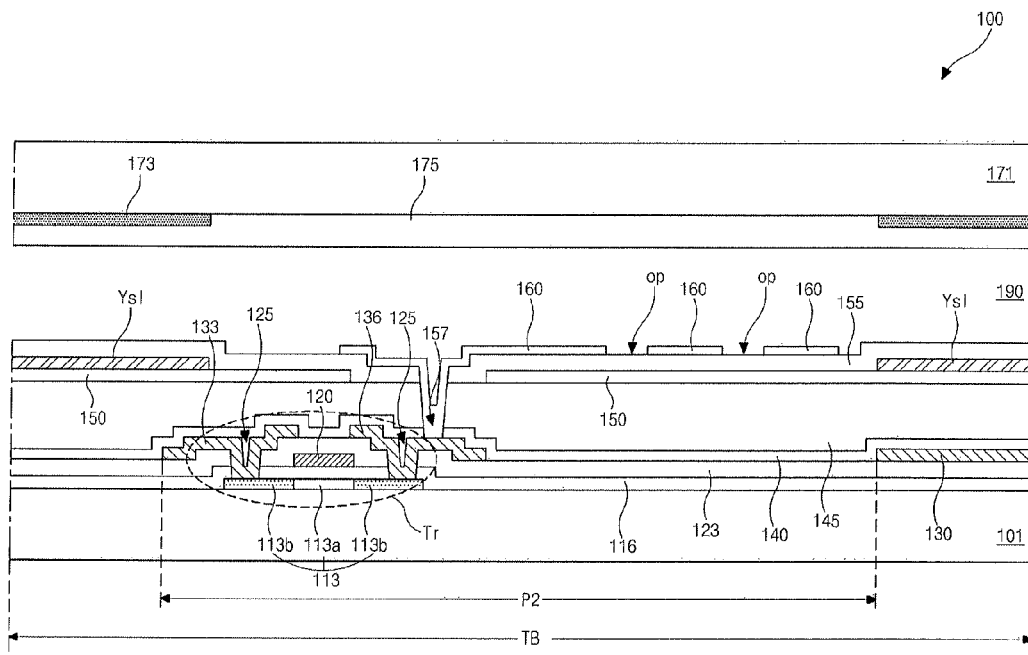

Next, as shown in FIG. 11C, the first substrate 101 and the second substrate 171 are disposed such that the color filter layer 175 faces the pixel electrode 160, and a seal pattern (not shown) is formed along edges of one of the first substrate 101 and the second substrate 171. Next, the liquid crystal layer 190 is disposed between the first substrate 101 and the second substrate 171, and first substrate 101 and the second substrate 171 are attached to form a liquid crystal panel.

Figure 11D:
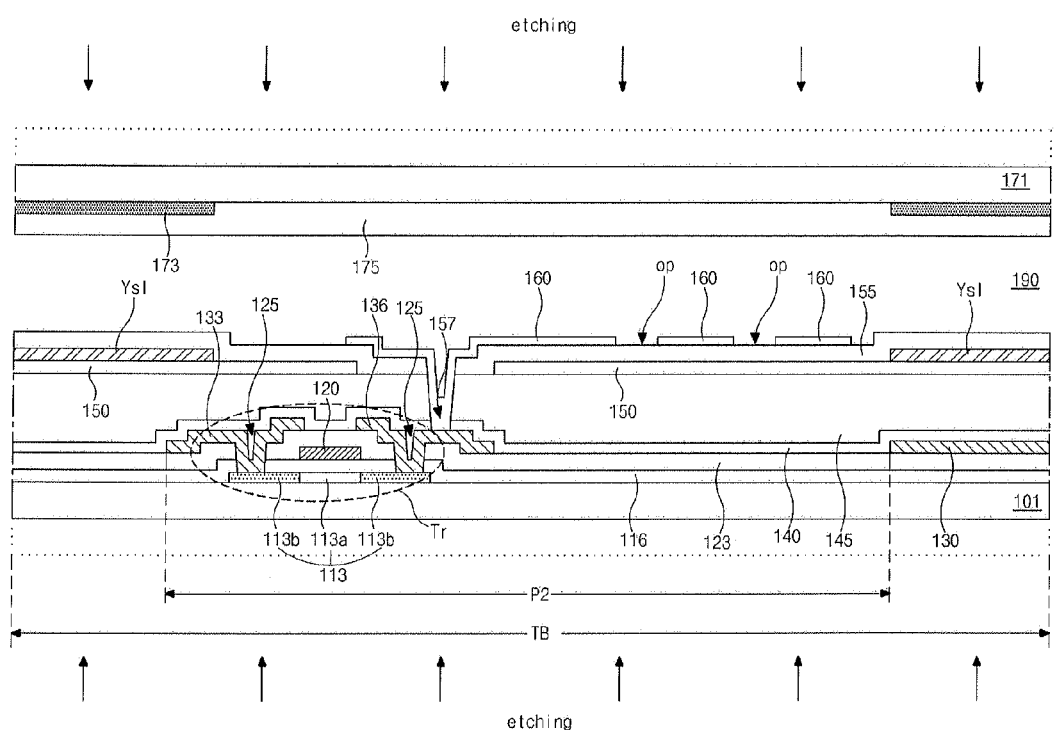

Next, as shown in FIG. 11D, the liquid crystal panel is exposed to an etchant, which is capable of etching glass of the first and second substrates 101 and 171, to reduce a thickness of each of the first and second substrates 101 and 171. Namely, a thickness of liquid crystal panel is reduced. For example, the etchant may include hydrofluoric acid (HF). A dipping process or a spray process may be used. As a result, light weight and thin profile LCD device can be obtained.

When the thickness of the first and second substrates 101 and 171 are reduced before forming elements, for example, the TFT Tr or the color filter layer 175, there may be crack or brokenness. Accordingly, as mentioned above, after forming the elements on the first and second substrates 101 and 171 having a thickness of about 0.5 to 0.7 mm, the etching process is performed to reduce the thickness of the first and second substrates 101 and 171. For example, the first and second substrates 101 and 171 may have a thickness of about 0.2 to 0.3 mm after the etching process.

Figure 11E:
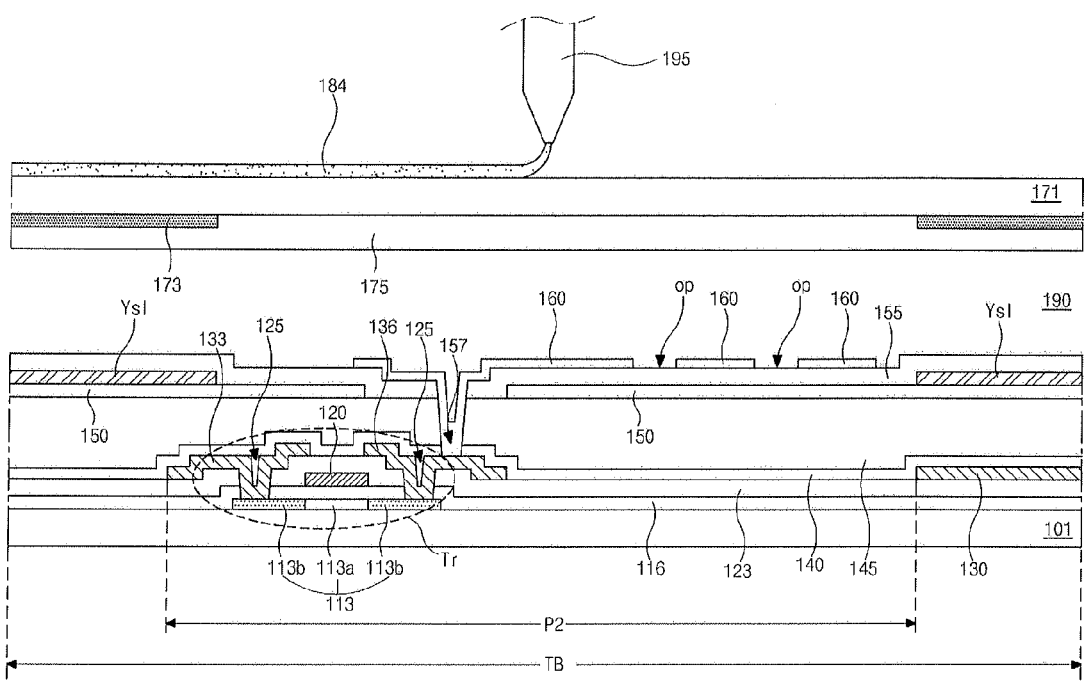

Next, as shown in FIG. 11E, a liquid phase mixture including one of a conductive polymer and a conductive inorganic material and a thermo-setting binder with a solvent is coated on an outer side of the second substrate 171 under a room temperature by a spin coating apparatus (not shown) or a slit coating apparatus 195 to form a anti-static material layer 184.

Figure 11F:
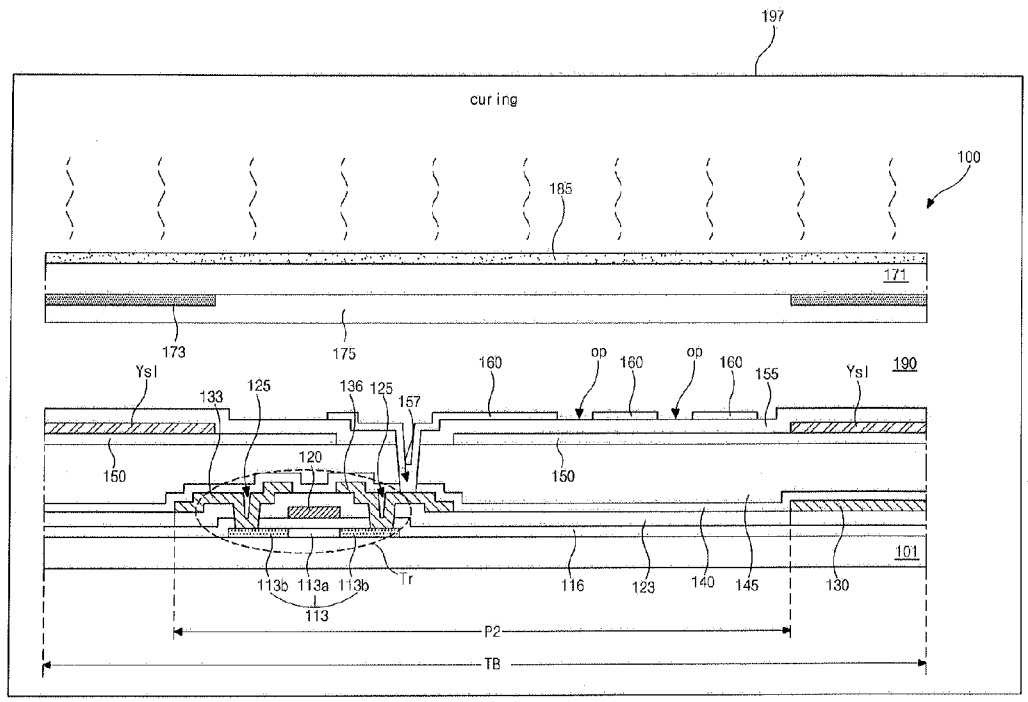
Figure 11G:
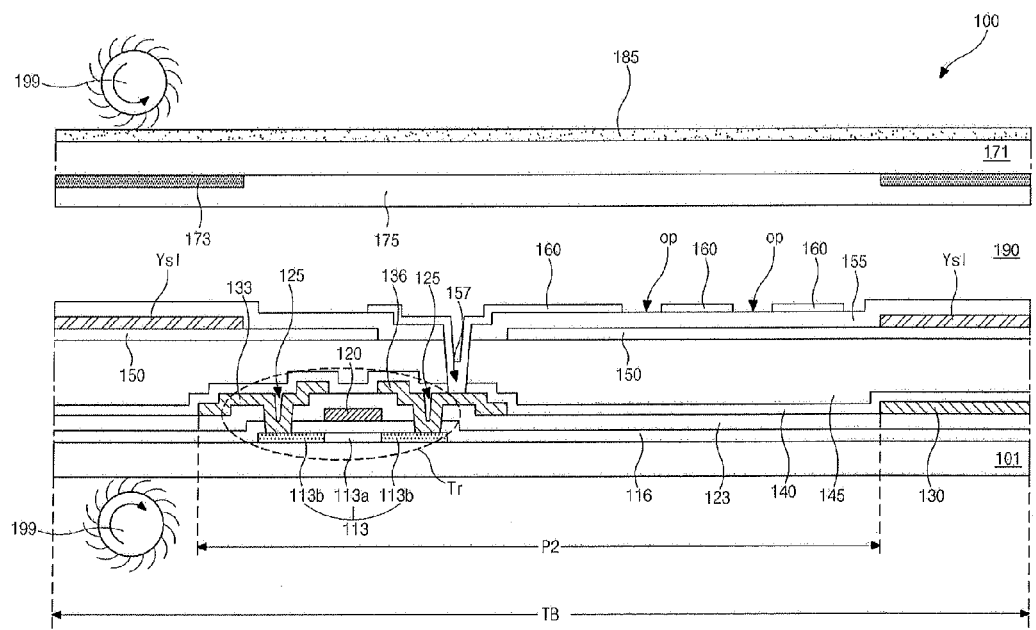

Next, as shown in FIG. 11F, the anti-static material layer 184 (of FIG. 11E) is dried and cured by heating in a furnace or oven 197 under a temperature below 100° C. to volatilize and remove the solvent and generate a cross-linking structure therein. As a result, the anti-static layer 185 is formed on the outer side of the second substrate 171. As mentioned above, the anti-static layer 185 has a sheet resistance of several tens Mega ohms per square (Ω/sq) to several hundreds Mega ohms per square (Ω/sq), a transmittance above 98%, hardness of 7H to 9H. For example, the anti-static layer 185 has a thickness of about 500 to 5000 Å. In addition, since the thermo-setting binder includes silicon molecules, an adhesive property with the second substrate 171 is increased.

In this case, the curing or heating process is performed under a temperature below 100° C., beneficially a temperature of 50 to 80° C. Because there is the liquid crystal layer 190 between the first and second substrates 101 and 171 when the curing or heating process is performed, there are serious damages on the liquid crystal panel if the curing or heating process is performed under a temperature above 100° C. For example, the seal pattern may be collapsed by an expansion of the liquid crystal layer 190.

Next, as shown in FIG. 10G, a cleaning process using a brush 199 or a blade is performed onto surfaces of the liquid crystal panel 100 to remove particles on the surfaces of the liquid crystal panel 100. Since the anti-static layer 185 has hardness of 7H to 9H, there is no damage on the anti-static layer 185 by the brush 199 or blade. Next, first and second polarizing plates (not shown) are respectively formed on an outer side of the first substrate 101 and an outer side of the anti-static layer 185. Next, although not shown, the X direction sensing circuit and the Y direction sensing circuit, which are respectively connected to the X direction sensing line and the Y direction sensing line, and a driving circuit connected to the gate line 119 and the data line 130 are formed on the liquid crystal panel to obtain the device.

Figure 12:
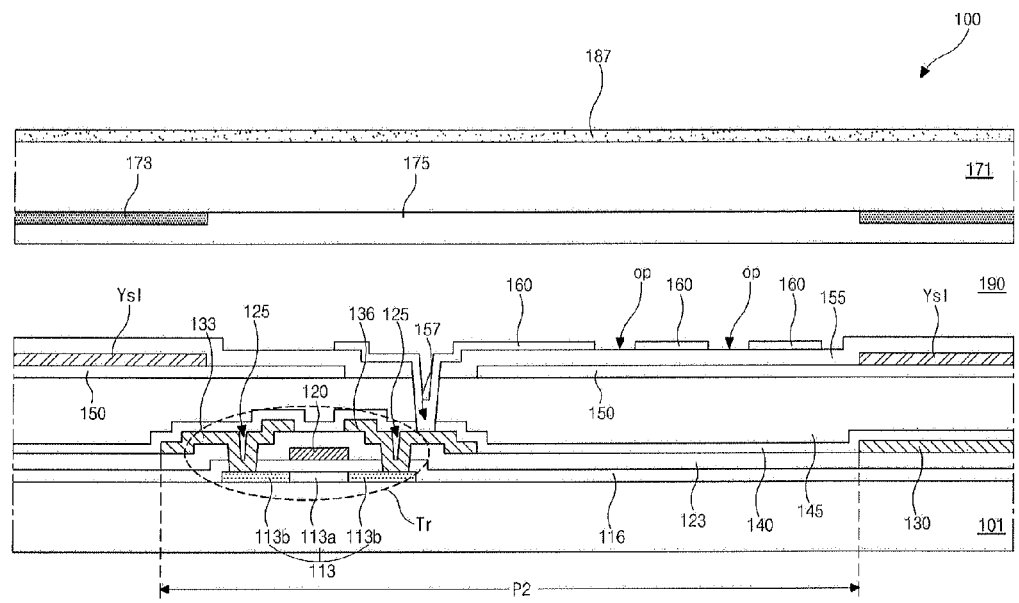
FIG. 12 is a cross-sectional view showing a portion of a touch sensing type LCD according to the present invention and taken along the line V-V of FIG. 4.

FIG. 12 is a cross-sectional view showing a portion of a touch sensing type LCD according to the present invention and taken along the line V-V of FIG. 4. The device shown by FIG. 12 has a difference in an anti-static layer with the device shown by FIGS. 5 and 6, and 9.

Referring to FIG. 12 with FIGS. 3 and 6 or 9, a gate line 119 and a data line 130 are formed on a first substrate 101. The gate and data lines 119 and 130 cross each other to define first to third pixel regions P1, P2 and P3. The first to third pixel regions P1, P2, P3 are respectively included to the first to third regions A1, A2 and A3.

In each pixel region P, a thin film transistor (TFT) Tr including a semiconductor layer 113, a gate electrode 120, a source electrode 133 and a drain electrode 136 is formed. The gate electrode 120 and the source electrode 133 respectively extend from the gate line 119 and the data line 130 such that the TFT Tr is electrically connected to the gate line 119 and the data line 130.

The semiconductor layer 113 is formed of polycrystalline silicon. A first semiconductor region 113a of a center of the semiconductor layer 113, which is formed of intrinsic polycrystalline silicon, serves as a channel, and second semiconductor regions 113b at both sides of the first semiconductor region 113a are doped by high-concentration impurities. A gate insulating layer 116 is formed on the semiconductor layer 113.

The gate electrode 120 is formed on the gate insulating layer 116 and corresponding to the first semiconductor region 113a. The gate line 119 is formed on the gate insulating layer 116 and connected to the gate electrode 120. A connection line 152 is also formed on the gate insulating layer 116 and parallel to the gate line 119. The connection line 152 is spaced apart from the gate line. The connection line 152 is disposed in the second pixel region P2 of the second region A2, and both ends of the connection line 152 are respectively disposed in the first pixel region P1 of the first region A1 and the third pixel region P3 of the third region A3.

An interlayer insulating layer 123 is formed on the gate line 119, the gate electrode 120 and the connection line 152. For example, the interlayer insulating layer 123 may be formed of an inorganic insulating material, for example, silicon oxide or silicon nitride. The interlayer insulating layer 123 and the gate insulating layer 116 are patterned to form semiconductor contact holes 125 exposing the second semiconductor regions 113b of the semiconductor layer 113.

On the interlayer insulating layer 123, the data line 130 is formed to cross the gate line 119. In addition, the source electrode 133 and the drain electrode 136 are formed on the interlayer insulating layer 123. The source and drain electrodes 133 and 136 respectively contact the second semiconductor regions 113b through the semiconductor contact holes 125.

As mentioned above, the semiconductor layer 113, the gate insulating layer 116, the gate electrode 120, the interlayer insulating layer 123, the source electrode 133 and the drain electrode 136 constitute the TFT Tr. This may be referred to as a top gate type TFT. Alternatively, a bottom gate type TFT, where a semiconductor layer is positioned between a gate electrode as a lower layer of the TFT and source and drain electrodes as a upper layer of the TFT, may be used.

A first passivation layer 140, which is formed of an inorganic insulating material, for example, silicon oxide or silicon nitride, and a second passivation layer 145, which is formed of an organic insulating material, for example, photoacryl or benzocyclobutene (BCB), are stacked on the data line 130, the source electrode 133 and the drain electrode 136. The second passivation layer 145 may have a thickness about 2 to 4 micrometers to provide a flat top surface. Since an adhesive strength between a metallic material of the data line 130 and the organic insulating material of the second passivation layer 145 is smaller than an adhesive strength between a metallic material of the data line 130 and the inorganic insulating material of the first passivation layer 140 and between the inorganic insulating material of the first passivation layer 140 and the organic insulating material of the second passivation layer 145, an adhesive property between the metallic material of the data line 130 and the organic insulating material of the second passivation layer 145 is improved due to the first passivation layer 140. The first passivation layer 140 may be omitted.

A common electrode 150, which has an island shape in each of the first to third regions A1, A2 and A3, is formed on the second passivation layer 145. Namely, the common electrode 150 in the second region A2 is separated from that in each of the first and third regions A1 and A3. The common electrode 150 has a plate shape. The common electrode 150 is formed of a transparent conductive material, for example, indium-tin-oxide (ITO) or indium-zinc-oxide (IZO).

An X direction sensing line Xsl and a Y direction sensing line Ysl are formed on the common electrode 150. The X direction sensing line Xsl overlaps the gate line 119 in the first and third regions A1 and A3, and the Y direction sensing line Ysl overlaps the data line 130 in the second region A2. The Y direction sensing line Ysl extends along the data line 130 such that the second regions A2 arranged along the data line 130 are electrically connected by the Y direction sensing line Ysl. The X direction sensing lines Xsl in the first and third regions A1 and A2 of each touch block TB (of FIG. 3) are electrically connected to each other through the connection line 152.

A third passivation layer 155 is formed on the X direction sensing line Xsl and the Y direction sensing line Ysl. The third passivation layer 155 may be formed of an inorganic insulating material, for example, silicon oxide or silicon nitride.

The first to third passivation layers 140, 145 and 155 are patterned to form a drain contact hole 157 exposing the drain electrode 136. In addition, the third passivation layer 155 is patterned to form first and second contact holes 158a and 159a respectively exposing the X sensing lines Xsl in the first and third regions A1 and A3. Furthermore, the first to third passivation layer 140, 145 and 155 and the interlayer insulating layer 123 are patterned to form third and fourth contact holes 158b and 159b respectively exposing ends of the connection line 152.

A pixel electrode 160 is formed on the third passivation layer 155. The pixel electrode 160 is disposed in each pixel region P and contacts the drain electrode 136 through the drain contact hole 157. The pixel electrode 160 is formed of a transparent conductive material, for example, ITO or IZO. The pixel electrode 160 has at least one opening op, which corresponds to the common electrode 150, such that a fringe field is generated between the pixel and common electrodes 160 and 150. The third passivation layer 155 is interposed between the pixel and common electrodes 160 and 150 such that a storage capacitor is formed.

In addition, first and second connection patterns 162 and 164 are formed on the third passivation layer 155. One end of the first connection pattern 162 contacts the X direction sensing line Xsl in the first region A1 through the first contact hole 158a, and the other end of the first connection pattern 162 contacts the connection line 152 through the third contact hole 158b. One end of the second connection pattern 164 contacts the X direction sensing line Xsl in the third region A3 through the second contact hole 159a, and the other end of the second connection pattern 164 contacts the connection line 152 through the fourth contact hole 159b. As a result, the X direction sensing line Xsl in the first region A1 is electrically connected to the X direction sensing line Xsl in the third region A3.

A second substrate 171 faces the first substrate 101. A black matrix 173 is formed on an inner side of the second substrate 171. The black matrix 173 corresponds to boundaries of the pixel region P and has a lattice shape. The black matrix 173 may further correspond to the TFT Tr. A color filter 175 is formed on the inner side of the second substrate 171 and corresponds to the pixel region P. The color filter 175 may include red, green and blue color filters.

In addition, an anti-static layer 187 is formed on an outer side of the second substrate 171. The anti-static layer 187 includes a conductive polymer, one of a UV-setting binder and a thermo-setting binder, and a stabilizer. The anti-static layer 187 may further include a multi-functional monomer. The anti-static layer 187 has a sheet resistance of several tens Mega ohms per square ($\Omega$/sq) to several Giga ohms per square ($\Omega$/sq) and hardness of 7 to 9H. For example, the anti-static layer 187 has a sheet resistance of 80 Mega ohms per square ($\Omega$/sq) to 2 Giga ohms per square ($\Omega$/sq). The sheet resistance of the anti-static layer 187 has a range within 80 Mega ohms per square ($\Omega$/sq) to 2 Giga ohms per square ($\Omega$/sq) even though it is exposed to a temperature of 60° C. to 100° C., a humidity of 60 to 100% and a time above 200 hours.

For example, the conductive polymer may include one of polyaniline, poly(3,4-ethylenedioxythiophene) (PEDOT), polyacetylene, polypyrrole, polythiophene, and polysulfurnitride. The UV-setting binder may include one of acrylate, urethane acrylate oligomer, and acrylate monomer.

For example, the stabilizer includes one of 2,5-dihydro-1H-imidazole shown by following formula 2 as an imidazole-based material, 3,4-dihydroxyfuran-2(5H)-one shown by following formula 3 as a hydroxyfuran-based material, and 3,4,5-trihydroxybenzoic acid shown by following formula 4 as a phenolic ester-based material.

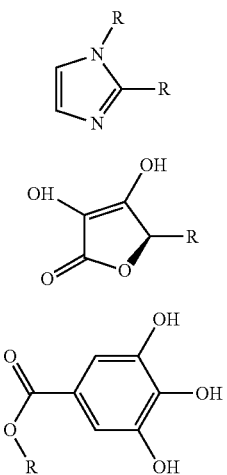

[Formula 2]

[Formula 3]

[Formula 4]

The thermo-setting binder includes silsesquioxane as a silane-based monomer and is cured under a relatively low temperature below 100° C. such that the anti-static layer 185 has hardness of 7 to 9H. For example, the thermo-setting binder may include one of tetraehoxysilane (TEOS) and tetramethoxysilane (TMOS).

On the other hand, the conductive polymer has a conductivity of about 102 s/cm to about 10-5 s/cm. Namely, the conductive polymer has a specific resistance of about 10-2 Ωcm to about 105 Ωcm.

When only the conductive polymer, which has a specific resistance of about 10-2 Ωcm to about 105 Ωcm, is used for the anti-static layer, a static electricity is effectively discharged because the conductive polymer has enough conductivity. However, the device can not be operated by a touch sensing because the anti-static layer including only the conductive polymer has too low specific resistance.

In the present invention, since the anti-static layer 187 includes the conductive polymer with the UV-setting binder or the thermo-setting binder to have a sheet resistance of several tens Mega ohms per square (Ω/sq) to several Giga ohms per square (Ω/sq), the anti-static layer 187 serves as an element for a touch sensing as well as a path for a static electricity.

Namely, since the anti-static layer 187 has a sheet resistance of several tens Mega ohms per square (Ω/sq) to several Giga ohms per square (Ω/sq), the anti-static layer 183 serves as a path for a static electricity such that there is no damage on the device from the static electricity. In addition, since the anti-static layer 187 has a sheet resistance of several tens Mega ohms per square (Ω/sq) to several Giga ohms per square (Ω/sq), a change of capacitance by a touch can be detected such that the device can be operated by a touch sensing type.

In addition, the anti-static layer 187 includes the stabilizer to secure stability of the sheet resistance under high temperature and humidity condition. Furthermore, the anti-static layer 187 may further include the multi-functional monomer, for example, trimethylolpropane triacrylate (TMPTA), which has a molecular weight of about 300 to 400, to increase an adhesive strength onto the substrate 171.

As mentioned above, the anti-static layer 187 has a thickness of about 500 to 5000 Å and a sheet resistance of several tens Mega ohms per square (Ω/sq) and several Giga ohms per square (Ω/sq). In addition, the anti-static layer 187 has a transmittance above 98%. The anti-static layer 187 has hardness of 7 to 9H greater than 6H of hardness of an inorganic insulating material layer. Moreover, a range of the sheet resistance of the anti-static layer 187 may be maintained even when it is exposed to a temperature of 60° C. to 100° C., a humidity of 60 to 100% and a time above 200 hours.

By providing a liquid crystal layer 190 between the first and second substrates 101 and 171 and a seal pattern (not shown) at edges of one of the first and second substrates 101 and 171, the touch sensing type FFS mode LCD device is obtained. An FFS mode LCD device, which includes the common electrode having a plate shape and the pixel electrode having an opening, is show by FIG. 12. Alternatively, an IPS mode LCD device, which includes the common and pixel electrodes being alternately arranged with each other, is also available.

As mentioned above, the touch sensing type LCD device includes the anti-static layer 187, which includes a conductive polymer, an ultraviolet (UV)-setting binder and transparent silica having a hydrophilic property to have a sheet resistance of several tens Mega ohms per square (Ω/sq) to several Giga ohms per square (Ω/sq), at an outer side of the second substrate 171. The anti-static layer 187 serves as a path for a static electricity and does not serve as an obstructer for touch sensing. Namely, the anti-static layer 187 serves as a dielectric layer between a finger and the common electrode 150 when the device is touched such that a capacitor is formed between the finger and the common electrode 150. As a result, a touch is detected by a change of capacitance between the finger and the common electrode 150.

In more detail, when one touch block TB (of FIG. 3) is touched, the anti-static layer 187, which has a sheet resistance of several tens Mega ohms per square (Ω/sq) to several Giga ohms per square (Ω/sq), serves as a dielectric layer such that a capacitor is generated by the finger, the common electrode 150, the liquid crystal layer 190, the color filter layer 175, the second substrate 171, the anti-static layer 187, and so on. A change of capacitance of the capacitor is detected by the X direction sensing circuit (not shown) and the Y direction sensing circuit (not shown) through the X direction sensing line Xsl and the Y direction sensing line Ysl, which are respectively connected to the common electrode 150, such that a position of the touched touch block TB is sensed.

Since the static electricity has a voltage of several thousands to several hundreds of thousands, the anti-static layer 187, which has a sheet resistance of several tens Mega ohms per square (Ω/sq) to several Giga ohms per square (Ω/sq), serves as a conductive path for the static electricity. However, since an electric current of the finger has a range within several nano-amperes to several micro-amperes, the anti-static layer 187, which has a sheet resistance of several tens Mega ohms per square (Ω/sq) to several Giga ohms per square (Ω/sq), serves as an insulating layer for the touch. Accordingly, the anti-static layer 187 serves as a dielectric layer of the capacitor for the touch. As a result, the device according to the present invention including a touch sensing part, i.e., the X direction sensing line Xsl and the Y direction sensing line Ysl, and the anti-static layer 187 can be operated by a touch sensing, and there is no damage from a static electricity.

In addition, since the anti-static layer 187 has hardness of 7 to 9H due to the UV-setting binder or the thermo-setting binder, there is no damage, e.g., a scratch, on the anti-static layer 187. Namely, there is no damage, e.g., a scratch, on the anti-static layer 187 even during the cleaning process using by a brush or a blade for a polarizing plate.

Furthermore, since the anti-static layer 187 includes the stabilizer, a range of the sheet resistance of the anti-static layer 187 may be maintained even when it is exposed to a temperature of 60° C. to 100° C., a humidity of 60 to 100% and a time above 200 hours.

Figure 13:
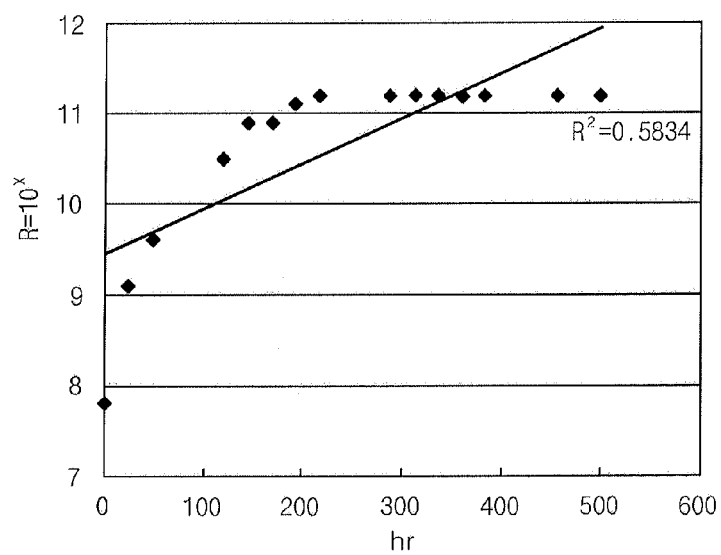
FIG. 13 is a graph illustrating a sheet resistance of an anti-static layer, which does not include a stabilizer, depending on a time.
Figure 14:
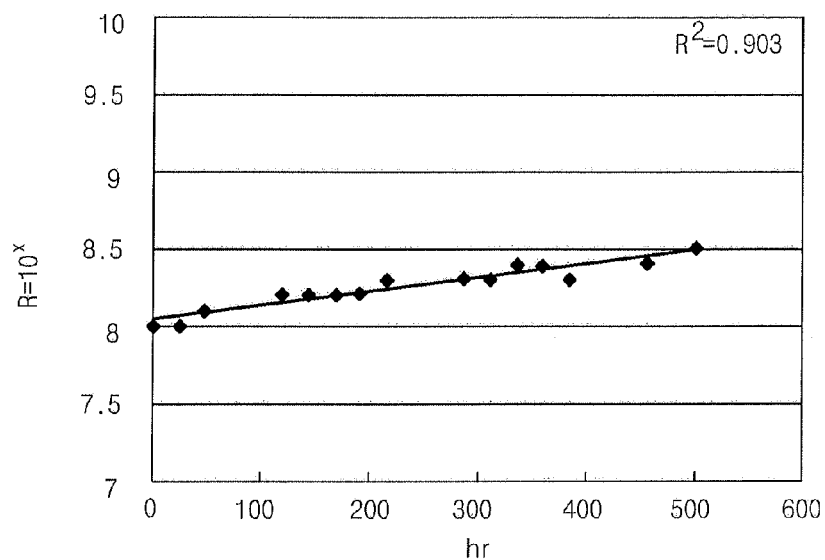
FIG. 14 is a graph illustrating a sheet resistance of an anti-static layer, which includes a stabilizer, depending on a time.

FIG. 13 is a graph illustrating a sheet resistance of an anti-static layer, which does not include a stabilizer, depending on a time, and FIG. 14 is a graph illustrating a sheet resistance of an anti-static layer, which includes a stabilizer, depending on a time.

As shown in FIG. 13, a sheet resistance of the anti-static layer, which does not include the stabilizer, is rapidly increased depending on a time under high temperature, i.e., 60 to 100° C., and high humidity, i.e., 60 to 100%, condition. When the anti-static layer is exposed to the above condition for above 50 hours, the sheet resistance of the anti-static layer is greater than 2 Giga ohms per square (Ω/sq).

However, as shown in FIG. 14, a sheet resistance of the anti-static layer, which includes the stabilizer as the present invention, is maintained with a range of several tens Mega ohms per square (Ω/sq) to several Giga ohms per square (Ω/sq), specifically, 80 Mega ohms per square (Ω/sq) to 2 Giga ohms per square (Ω/sq), under the condition for above 500 hours.

FIGS. 15A to 15G are cross-sectional view showing a fabricating process of a touch sensing type LCD device according to an embodiment of the present invention.

The process shown by FIGS. 15A to 15G has differences in a step of forming the anti-static layer and a step of etching the first and second substrates from the process shown by FIGS. 7A to 7G. Accordingly, below explanation is focused on the differences.

Figure 15A:
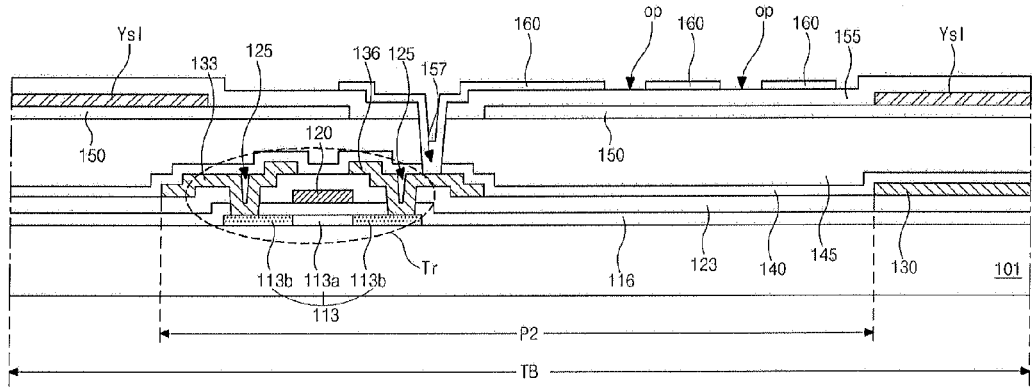
FIGS. 15A to 15G are cross-sectional view showing a fabricating process of a touch sensing type LCD device according to an embodiment of the present invention.

As shown in FIG. 15A, the array substrate is obtained by forming the TFT Tr, the gate line 119, the data line 130, the X direction sensing line Xsl, the Y direction sensing line Ysl, the common electrode 150, the pixel electrode 160, the connection line 152, the connection patterns 162 and 164, and so on.

Figure 15B:
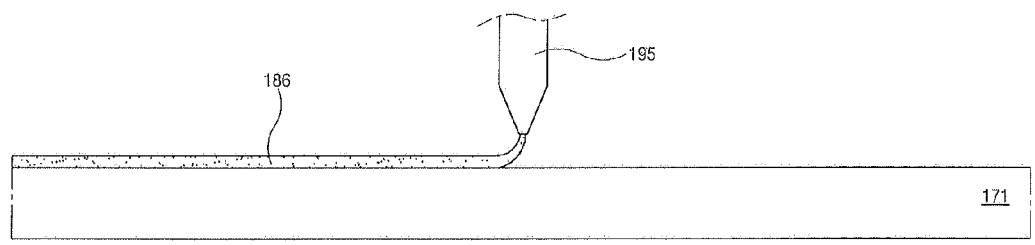

Next, as shown in FIG. 15B, a liquid phase polymer mixture including a conductive polymer, one of an ultraviolet (UV)-setting binder and a thermo-setting binder, a stabilizer, and a multi-functional monomer with a solvent is coated on an outer side of the second substrate 171 under a room temperature by a spin coating apparatus (not shown) or a slit coating apparatus 195 to form a polymer layer 186. The multi-functional monomer is not essential.

The conductive polymer, the UV-setting binder or the thermo-setting binder, and the stabilizer, and the multi-functional monomer are inserted into the solvent. The solvent has a relatively low boiling point to be cured under a relative low temperature less than 100° C. For example, the solvent may include one of isobutyl alcohol, isobutyl ketone, and methylethyl ketone. For example, a weight ratio of the conductive polymer to the UV-setting binder or the thermo-setting binder may be about 0.5:99.5 to about 10:90. A weight ratio of the stabilizer to the UV-setting binder or the thermo-setting binder may be about 1.0:99.0 to about 10:90. In addition, to increase an adhesive layer onto the substrate 171, the multi-functional monomer, for example, trimethylolpropane triacrylate (TMPTA), may be added into the liquid phase polymer mixture with a weight % being equal to or smaller than 0.5 with respect to the UV-setting binder or the thermo-setting binder.

Each of the conductive polymer and the stabilizer has a weight ratio less than 10% with respect to the UV setting-binder or the thermo-setting binder such that the anti-static layer 187 has a sheet resistance of several tens Mega ohms per square (Ω/sq) to several Giga ohms per square (Ω/sq) and a transmittance being equal to or greater than a layer of indium-tin-oxide (ITO). Generally, when indium-tin-oxide or indium-zinc-oxide is used for an anti-static layer, the anti-static layer has a transmittance of 96.5%. In the present invention, since each of the conductive polymer and the stabilizer has a weight % less than 10, the anti-static layer 187 has a transmittance above 96.5%.

The solvent with the conductive polymer, one of the UV-setting binder the thermo-setting binder, the stabilizer, and the multi-functional monomer is stirred for several minutes to several hours such that the conductive polymer, one of the UV-setting binder the thermo-setting binder, the stabilizer, and the multi-functional monomer are resolved and uniformly dispersed in the solvent.

Figure 15C:
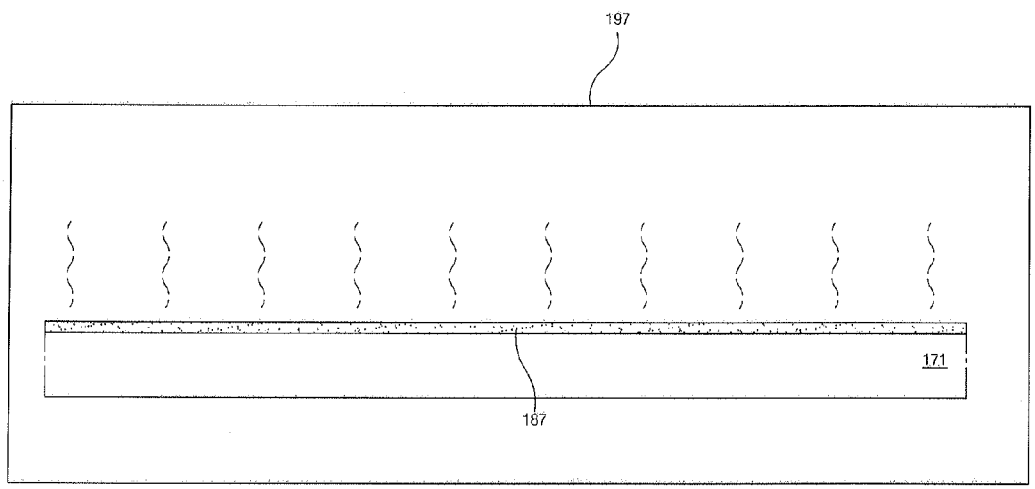

Next, as shown in FIG. 15C, the polymer layer 186 (of FIG. 15B) is dried by heating in a furnace or oven 197 to volatilize and remove the solvent. When the polymer layer 186 includes the thermo-setting binder, combination strength between the thermo-setting binder and the conductive polymer is enhanced by a cross-linking interconnection such that the anti-static layer 187 has hardness of 7 to 9H.

Figure 15D:
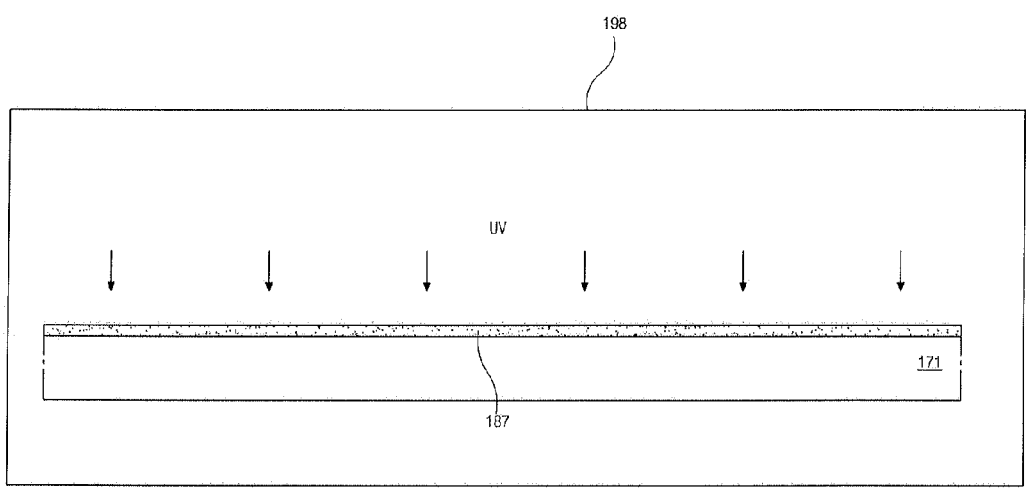

Alternatively, as shown in FIG. 15D, when the polymer layer 186 includes the UV-setting binder, a UV light is irradiated in a UV irradiating apparatus 198 to form a cross-linking in the anti-static layer 187 by the UV-setting binder. As a result, combination strength between the UV-setting binder and the conductive polymer in the anti-static layer 187 is enhanced with the cross-linking interconnection such that the anti-static layer 187 has hardness of 7 to 9H.

The anti-static layer 187 after a process of 15C or a process of 15D with 15C has a sheet resistance of several tens Mega ohms per square (Ω/sq) to several Giga ohms per square (Ω/sq) and a thickness of 500 to 5000 Å. In addition, a sheet resistance of the anti-static layer 187 is maintained with a range of several tens Mega ohms per square (Ω/sq) to several Giga ohms per square (Ω/sq), specifically, 80 Mega ohms per square (Ω/sq) to 2 Giga ohms per square (Ω/sq), under high temperature, e.g., 60 to 100° C., and high humidity, e.g., 60 to 100%, condition for above 200 hours.

Figure 15E:
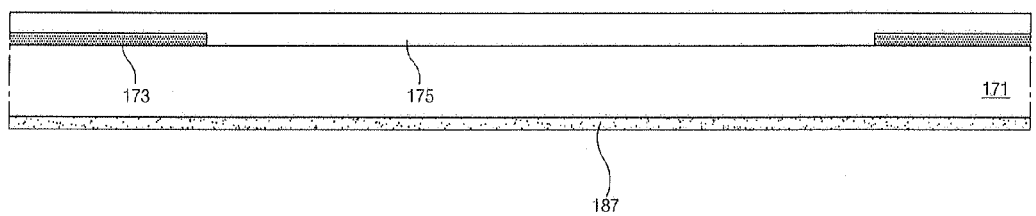
Figure 15F:
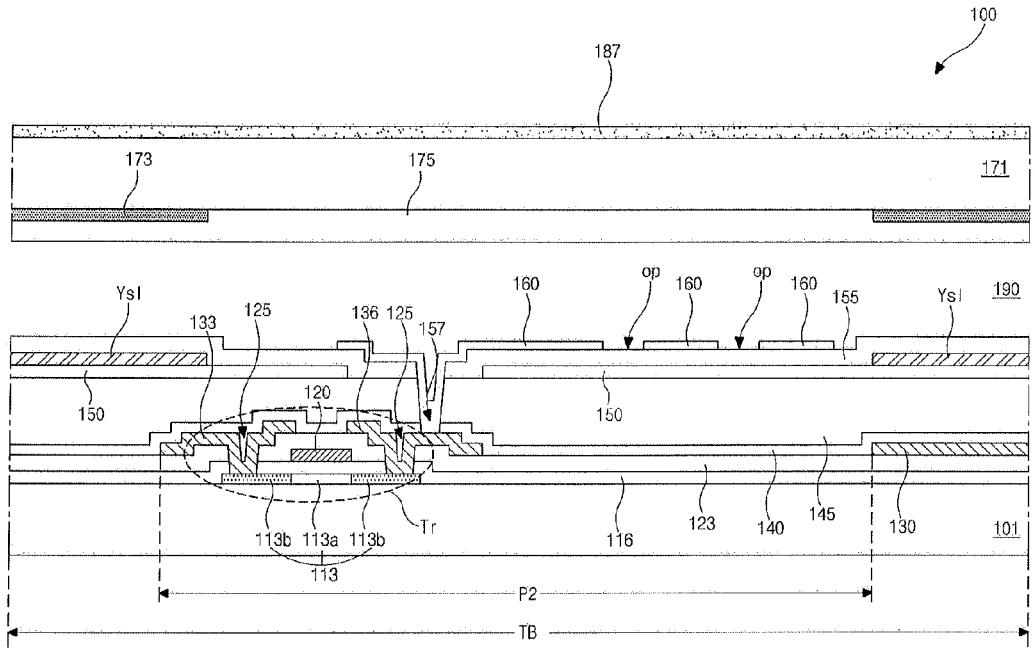
Figure 15G:
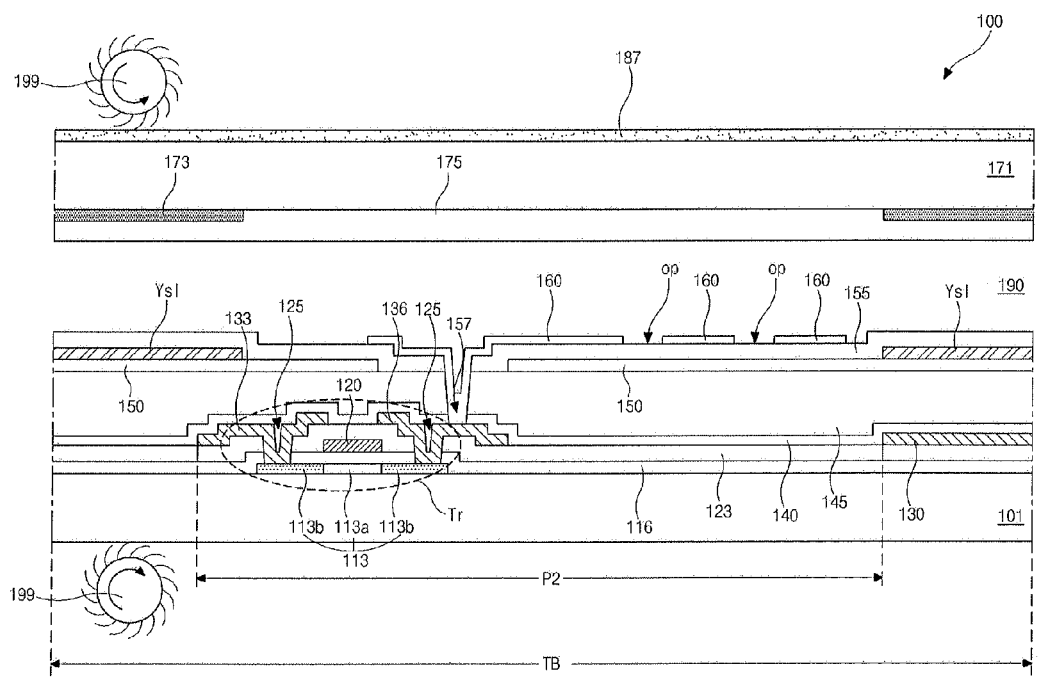

Next, as shown in FIG. 15E, a light blocking material, for example, a black resin, is coated on an inner side of the second substrate 171 and patterned by a mask process to form the black matrix 173. Next, the color filter 175 including the red, green and blue color filters is formed on the inner side of the second substrate 171. As a result, a color filter substrate is obtained. Although not shown, an overcoat layer for providing a flat top surface may be formed.

Next, as shown in FIG. 7F, the array substrate and the color filter substrate are disposed such that the color filter layer 175 faces the pixel electrode 160, and a seal pattern (not shown) is formed along edges of one of the array substrate and the color filter substrate. Next, the liquid crystal layer 190 is disposed between the array substrate and the color filter substrate, and the array substrate and the color filter substrate are attached to form a liquid crystal panel.

Next, as shown in FIG. 7G, a cleaning process using a brush 199 or a blade is performed onto surfaces of the liquid crystal panel 100 to remove particles on the surfaces of the liquid crystal panel 100. Since the anti-static layer 187 has hardness of 7 to 9H, there is no damage on the anti-static layer 187 by the brush 199 or blade. Next, first and second polarizing plates (not shown) are respectively formed on an outer side of the first substrate 101 and an outer side of the anti-static layer 187. Next, although not shown, the X direction sensing circuit and the Y direction sensing circuit, which are respectively connected to the X direction sensing line and the Y direction sensing line, and a driving circuit connected to the gate line 119 and the data line 130 are formed on the liquid crystal panel to obtain the device.

FIGS. 16A to 16G are cross-sectional view showing a fabricating process of a touch sensing type LCD device according to an embodiment of the present invention.

The process shown by FIGS. 16A to 16G has differences in a step of forming the anti-static layer and a step of etching the first and second substrates from the process shown by FIGS. 15A to 15G. Accordingly, below explanation is focused on the differences.

Figure 16A:
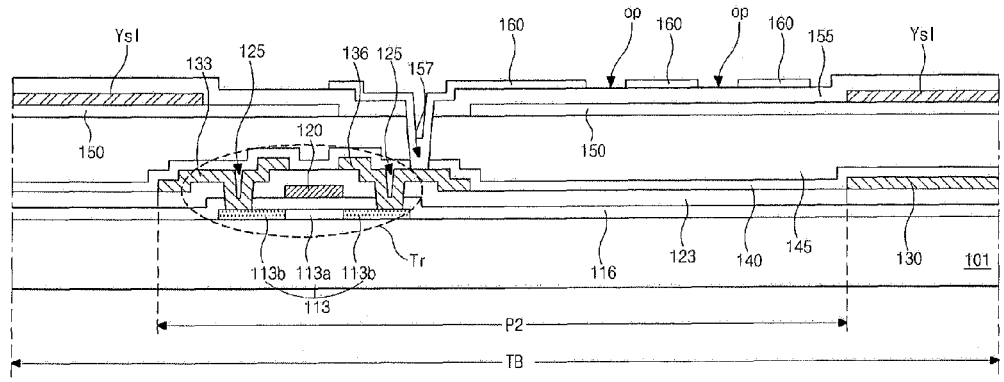
FIGS. 16A to 16G are cross-sectional view showing a fabricating process of a touch sensing type LCD device according to an embodiment of the present invention.

As shown in FIG. 16A, the array substrate is obtained by forming the TFT Tr, the gate line 119, the data line 130, the X direction sensing line Xsl, the Y direction sensing line Ysl, the common electrode 150, the pixel electrode 160, the connection line 152, the connection patterns 162 and 164, and so on.

Figure 16B:
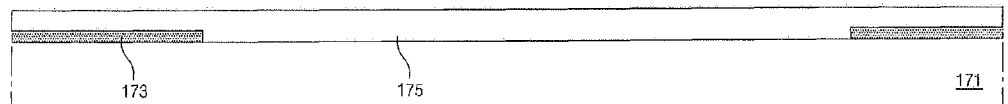

Next, as shown in FIG. 16B, the black matrix 173 and the color filter layer 175 are formed on an inner side of the second substrate 171. Although not shown, an overcoat layer may be formed on the color filter layer 175.

Figure 16C:
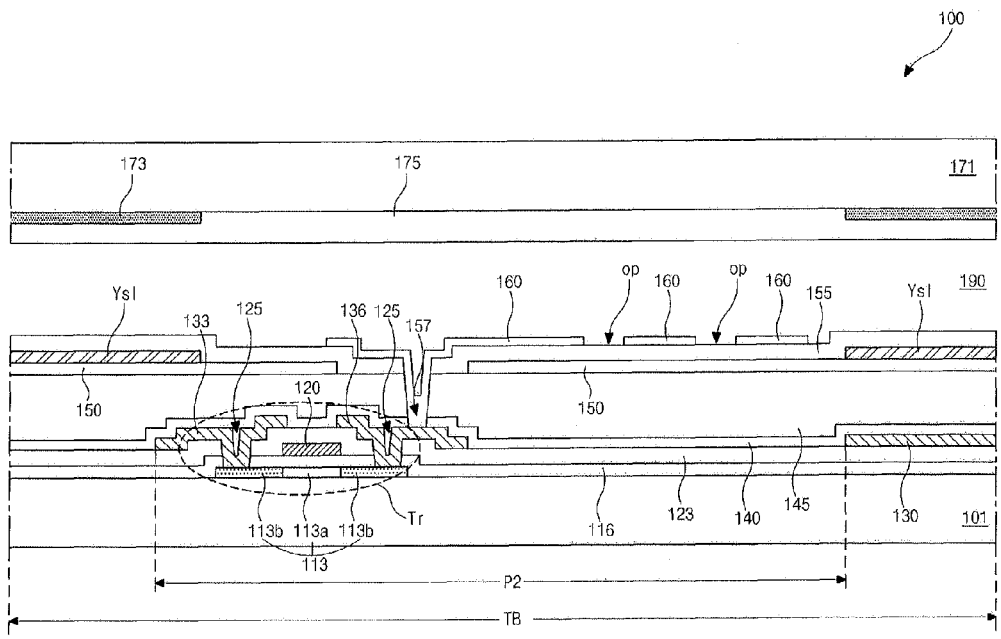

Next, as shown in FIG. 16C, the first substrate 101 and the second substrate 171 are disposed such that the color filter layer 175 faces the pixel electrode 160, and a seal pattern (not shown) is formed along edges of one of the first substrate 101 and the second substrate 171. Next, the liquid crystal layer 190 is disposed between the first substrate 101 and the second substrate 171, and first substrate 101 and the second substrate 171 are attached to form a liquid crystal panel.

Figure 16D:
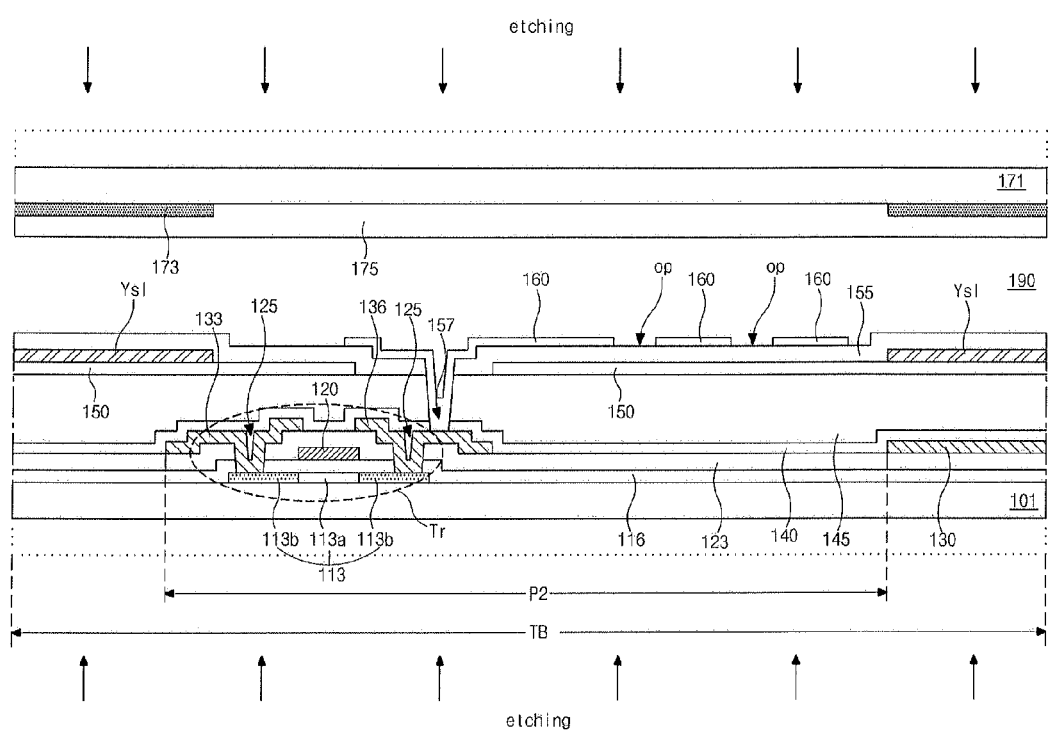

Next, as shown in FIG. 16D, the liquid crystal panel is exposed to an etchant, which is capable of etching glass of the first and second substrates 101 and 171, to reduce a thickness of each of the first and second substrates 101 and 171. Namely, a thickness of liquid crystal panel is reduced. For example, the etchant may include hydrofluoric acid (HF). A dipping process or a spray process may be used. As a result, light weight and thin profile LCD device can be obtained.

When the thickness of the first and second substrates 101 and 171 are reduced before forming elements, for example, the TFT Tr or the color filter layer 175, there may be crack or brokenness. Accordingly, as mentioned above, after forming the elements on the first and second substrates 101 and 171 having a thickness of about 0.5 to 0.7 mm, the etching process is performed to reduce the thickness of the first and second substrates 101 and 171. For example, the first and second substrates 101 and 171 may have a thickness of about 0.2 to 0.3 mm after the etching process.

Figure 16E:
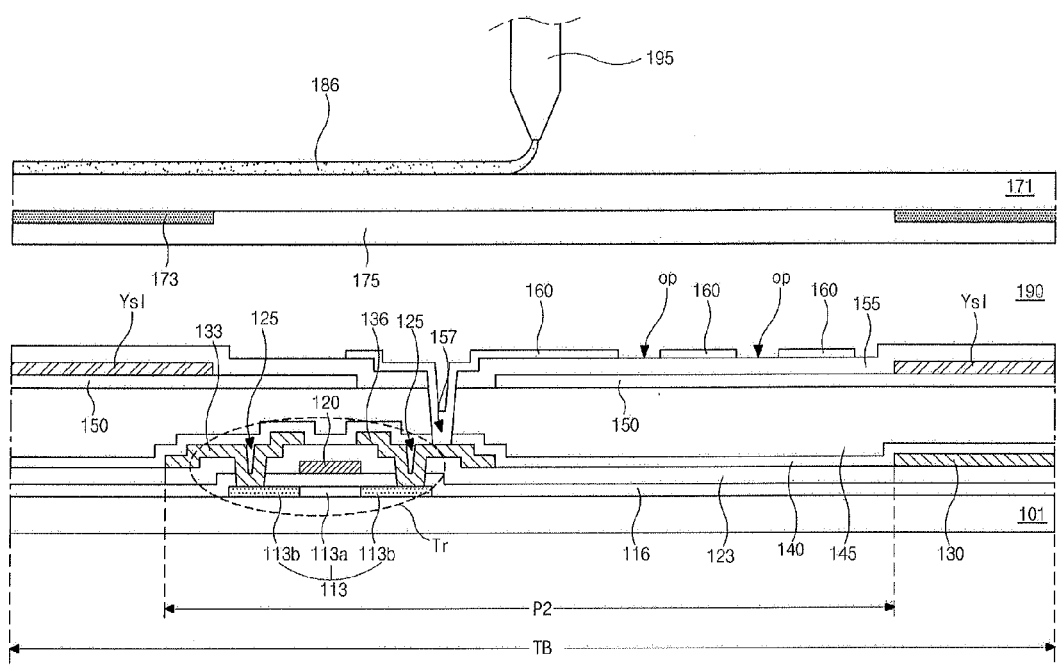

Next, as shown in FIG. 16E, a liquid phase polymer mixture including a conductive polymer, one of an ultraviolet (UV)-setting binder and a thermo-setting binder, a stabilizer, and a multi-functional monomer with a solvent is coated on an outer side of the second substrate 171 under a room temperature by a spin coating apparatus (not shown) or a slit coating apparatus 195 to form a polymer layer 186.

Figure 16F:
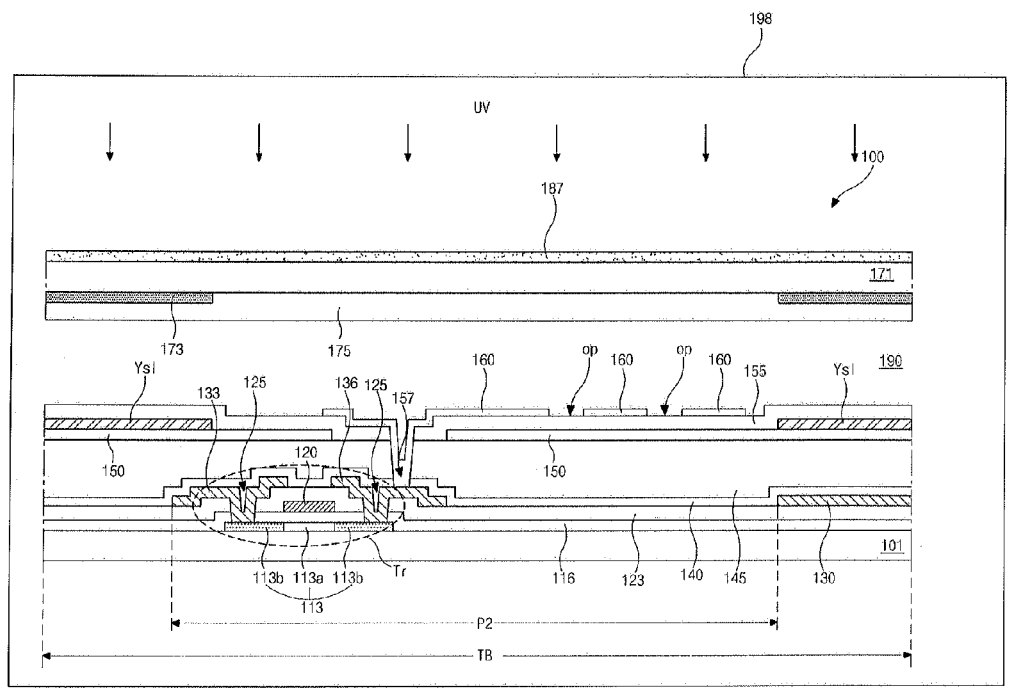

Next, as shown in FIG. 16F, the polymer layer 186 (of FIG. 16E) is dried by heating in a furnace or oven (not shown) to volatilize and remove the solvent. When the polymer layer 186 includes the thermo-setting binder, combination strength between the thermo-setting binder and the conductive polymer is enhanced by a cross-linking interconnection such that the anti-static layer 187 has hardness of 7 to 9H. In this case, the heating process is performed under a temperature below 100° C., beneficially a temperature of 50 to 80° C. Because there is the liquid crystal layer 190 between the first and second substrates 101 and 171 when the heating process is performed, there are serious damages on the liquid crystal panel if the heating process is performed under a temperature above 100° C. For example, the seal pattern may be collapsed by an expansion of the liquid crystal layer 190.

On the other hand, when the polymer layer 186 includes the UV-setting binder, a UV light is irradiated in a UV irradiating apparatus 198 to form a cross-linking in the anti-static layer 187 by the UV-setting binder. As a result, combination strength between the UV-setting binder and the conductive polymer in the anti-static layer 187 is enhanced with the cross-linking interconnection such that the anti-static layer 187 has hardness of 7 to 9H.

The anti-static layer 187 after a process of heating with the thermo-setting binder or a process of irradiating the UV with the UV-setting binder has a sheet resistance of several tens Mega ohms per square ($\Omega$/sq) to several Giga ohms per square ($\Omega$/sq) and a thickness of 500 to 5000 Å. In addition, a sheet resistance of the anti-static layer 187 is maintained with a range of several tens Mega ohms per square ($\Omega$/sq) to several Giga ohms per square ($\Omega$/sq), specifically, 80 Mega ohms per square ($\Omega$/sq) to 2 Giga ohms per square ($\Omega$/sq), under high temperature, e.g., 60 to 100° C., and high humidity, e.g., 60 to 100%, condition for above 200 hours.

Figure 16G:
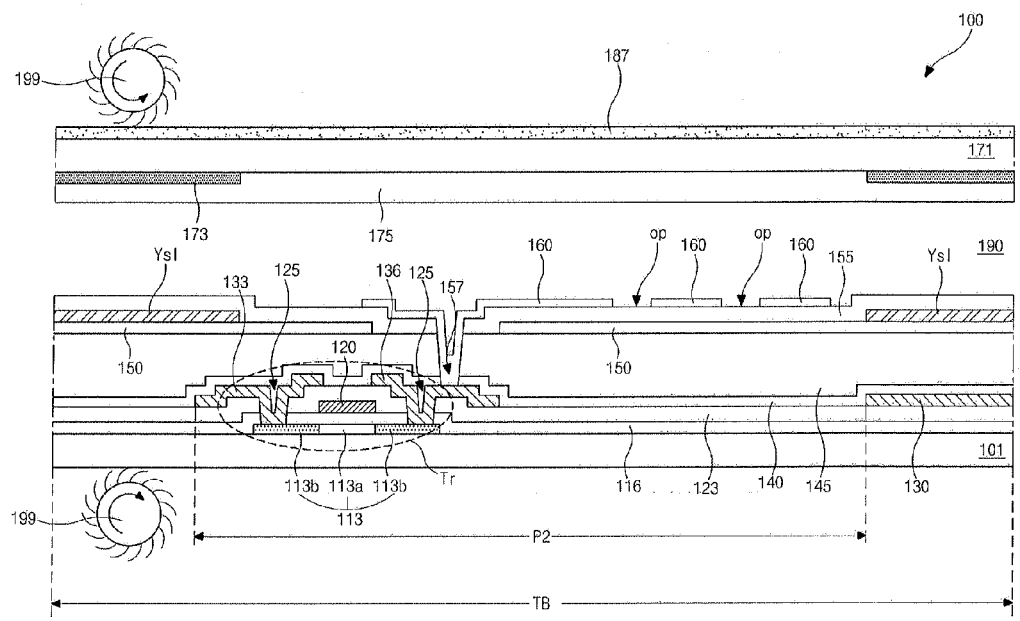

Next, as shown in FIG. 16G, a cleaning process using a brush 199 or a blade is performed onto surfaces of the liquid crystal panel 100 to remove particles on the surfaces of the liquid crystal panel 100. Since the anti-static layer 187 has hardness of 7 to 9H, there is no damage on the anti-static layer 187 by the brush 199 or blade. Next, first and second polarizing plates (not shown) are respectively formed on an outer side of the first substrate 101 and an outer side of the anti-static layer 187. Next, although not shown, the X direction sensing circuit and the Y direction sensing circuit, which are respectively connected to the X direction sensing line and the Y direction sensing line, and a driving circuit connected to the gate line 119 and the data line 130 are formed on the liquid crystal panel to obtain the device.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A capacitive touch sensing type liquid crystal display device, comprising:
    an array substrate including a first substrate, a gate line, a data line, a common electrode, a pixel electrode, and a touch sensing unit including an X direction sensing line extending along a direction of the gate line and a Y direction sensing line extending along a direction of the data line;
    a color filter substrate including a second substrate and facing the array substrate;
    an anti-static layer on an outer side of the second substrate and including a conductive polymer, a UV-setting binder and transparent silica and having a sheet resistance of several tens of Mega ohms per square ($\Omega$/sq) to several Giga ohms per square ($\Omega$/sq); and
    a liquid crystal layer between the first substrate and an inner side of the second substrate,
    wherein the X direction sensing line overlaps the gate line, and the Y direction sensing line overlaps the data line, and the X direction sensing line and the Y direction sensing line are formed on the common electrode, and
    wherein the X direction sensing line and the Y direction sensing line are configured to sense a change of capacitance between the common electrode and an object touching the anti-static layer.

2. The device according to claim 1, wherein the conductive polymer includes one of polyaniline, poly(3,4-ethylenedioxythiophene) (PEDOT), polyacetylene, polypyrrole, polythiophene, and polysulfurnitride.

3. The device according to claim 1, wherein the UV-setting binder include one of acrylate, urethane acrylate oligomer, and acrylate monomer.

4. The device according to claim 1, wherein the transparent silica has a hydrophilic property.

5. The device according to claim 1, wherein a weight ratio of the conductive polymer to the UV-setting binder is about 0.5:99.5 to about 10:90, and a weight ratio of the transparent silica to the UV-setting binder is about 10:90 to about 20:80.

6. The device according to claim 1, wherein the anti-static layer further includes a multi-functional monomer of trimethylolpropane triacrylate (TMPTA).

7. The device according to claim 6, wherein a weight % of the multi-functional monomer is equal to or smaller than 5% with respect to the UV-setting binder.

8. The device according to claim 1, wherein the anti-static layer has a thickness of about 500 to about 5000 Å.

9. The device according to claim 1, wherein the anti-static layer has a hardness being equal to or greater than 6H.

10. The device according to claim 1, wherein the touch sensing unit further includes:
an X direction sensing circuit at one end of the X direction sensing line; and
a Y direction sensing circuit at one end of the Y direction sensing line,
wherein a change of capacitance by a touch is detected by the X direction sensing circuit and the Y direction sensing circuit through the X direction sensing line and the Y direction sensing line, respectively.

11. The device according to claim 10, wherein a plurality of touch blocks are defined on the first substrate, and each touch block includes first to third regions, each of which includes at least one pixel region, and wherein the X direction sensing line is disposed at the first and third regions, and the Y direction sensing line is disposed at the second region.

12. The device according to claim 11, wherein the X direction sensing line in the first region is electrically connected to the X direction sensing line in the third region.

13. The device according to claim 12, wherein the touch sensing unit further includes a connection line in the second region for electrical connection of the X direction sensing line in the first region and the X direction sensing line in the third region.

14. The device according to claim 12, wherein the common electrode has an island shape in each of the first to third regions, and the X and Y direction sensing lines contacts the common electrode.

15. The device according to claim 1, wherein the array substrate further includes:
an interlayer insulating layer on the gate lines;
a thin film transistor in each pixel region and connected to the gate and data lines;
a first passivation layer on the data lines and the thin film transistor, wherein the common electrode is disposed on the first passivation layer and has an island shape in each of the first to third regions; and
a second passivation layer over the common electrode, wherein the first and second passivation layers have a drain contact hole exposing a portion of the thin film transistor,
wherein the pixel electrode is disposed on the second passivation layer and contacts the portion of the thin film transistor through the drain contact hole, and wherein the data line is disposed on the interlayer insulating layer and crosses the gate line to define a plurality of pixel regions, and a plurality of pixel regions from each of first to third regions.

16. The device according to claim 15, wherein the pixel electrode has at least one opening to generate a fringe field with the common electrode.

17. The device according to claim 15, wherein the color filter substrate further includes:
a black matrix corresponding to boundaries of each pixel region; and
a color filter layer corresponding to the each pixel region.

18. The device according to claim 15, wherein the touch sensing unit further includes:
a connection line in the second region under the interlayer insulating layer;
first and second connection patterns on the second passivation layer,
wherein the X direction sensing line is disposed on the common electrode in the first and third regions, and the Y direction sensing line is disposed on the common electrode in the second region,
wherein the second passivation layer has a first contact hole exposing an end of the X direction sensing line in the first region and a second contact hole exposing an end of the X direction sensing line in the third region, wherein the first and second passivation layers have a drain contact hole exposing a portion of the thin film transistor, and the first and second passivation layers and the interlayer insulating layer have third and fourth contact holes respectively exposing both ends of the connection line,
wherein one end of the first connection pattern contacts the X direction sensing line in the first region through the first contact hole, and the other end of the first connection pattern contacts one end of the connection line through the third contact hole, and
wherein one end of the second connection pattern contacts the X direction sensing line in the third region through the second contact hole, and the other end of the second connection pattern contacts the other end of the connection line through the fourth contact hole.

19. A capacitive touch sensing type liquid crystal display device, comprising:
an array substrate including a first substrate, a gate line, a data line, a common electrode, a pixel electrode, and a touch sensing unit including an X direction sensing line extending along a direction of the gate line and a Y direction sensing line extending along a direction of the data line;
a color filter substrate including a second substrate and facing the array substrate;
an anti-static layer on an outer side of the second substrate and including one of a conductive polymer or a conductive inorganic material and a thermo-setting binder and having a sheet resistance of several tens Mega ohms per square (a/sq) to several hundreds Mega ohms per square ($\Omega$/sq); and
a liquid crystal layer between the first substrate and an inner side of the second substrate,
wherein the X direction sensing line overlaps the gate line, and the Y direction sensing line overlaps the data line, and the X direction sensing line and the Y direction sensing line are formed on the common electrode, and
wherein the X direction sensing line and the Y direction sensing line are configured to sense a change of capacitance between the common electrode and an object touching the anti-static layer.

20. The device according to claim 19, wherein the conductive polymer includes one of polyaniline, poly(3,4-ethylenedioxythiophene) (PEDOT), polyacetylene, polypyrrole, polythiophene, and polysulfurnitride.

21. The device according to claim 19, wherein the conductive inorganic material includes one of indium-tin-oxide (ITO), indium-zinc-oxide (IZO) and tin oxide (TiO2).

22. The device according to claim 19, wherein the thermo-setting binder includes one of tetraethoxysilane (TEOS) and tetramethoxysilane (TMOS) and is cured under a temperature below 100° C.

23. The device according to claim 19, wherein a weight ratio of the one of the conductive polymer and the conductive inorganic material to the thermo-setting binder is about 0.5:99.5 to about 10:90.

24. The device according to claim 19, wherein the anti-static layer has a thickness of about 500 to about 5000 Å.

25. The device according to claim 19, wherein the anti-static layer has a hardness of 7H to 9H.

26. The device according to claim 19, wherein the touch sensing unit further includes:
an X direction sensing circuit at one end of the X direction sensing line; and
a Y direction sensing circuit at one end of the Y direction sensing line,
wherein a change of capacitance by a touch is detected by the X direction sensing circuit and the Y direction sensing circuit through the X direction sensing line and the Y direction sensing line, respectively.

27. The device according to claim 26, wherein a plurality of touch blocks are defined on the first substrate, and each touch block includes first to third regions, each of which includes at least one pixel region, and wherein the X direction sensing line is disposed at the first and third regions, and the Y direction sensing line is disposed at the second region.

28. The device according to claim 27, wherein the X direction sensing line in the first region is electrically connected to the X direction sensing line in the third region.

29. The device according to claim 28, wherein the touch sensing unit further includes a connection line in the second region for electrical connection of the X direction sensing line in the first region and the X direction sensing line in the third region.

30. The device according to claim 28, wherein the common electrode has an island shape in each of the first to third regions, and the X and Y direction sensing lines contacts the common electrode.

31. The device according to claim 19, wherein the array substrate further includes:
an interlayer insulating layer on the gate line;
a thin film transistor in each pixel region and connected to the gate and data lines;
a first passivation layer on the data line and the thin film transistor, wherein the common electrode is disposed on the first passivation layer and has an island shape in each of the first to third regions; and
a second passivation layer over the common electrode, wherein the first and second passivation layers have a drain contact hole exposing a portion of the thin film transistor,
wherein the pixel electrode is disposed on the second passivation layer and contacts the portion of the thin film transistor through the drain contact hole, and wherein the data line is disposed on the interlayer insulating layer and crosses the gate line to define a plurality of pixel regions, and a plurality of pixel regions from each of the first to third regions.

32. The device according to claim 31, wherein the pixel electrode has at least one opening to generate a fringe field with the common electrode.

33. The device according to claim 31, wherein the color filter substrate further includes:
a black matrix corresponding to boundaries of each pixel region; and
a color filter layer corresponding to the each pixel region.

34. The device according to claim 31, wherein the touch sensing unit includes:
a connection line in the second region under the interlayer insulating layer;
first and second connection patterns on the second passivation layer,
wherein the X direction sensing line is disposed on the common electrode in the first and third regions, and the Y direction sensing line is disposed on the common electrode in the second region,
wherein the second passivation layer has a first contact hole exposing an end of the X direction sensing line in the first region and a second contact hole exposing an end of the X direction sensing line in the third region, wherein the first and second passivation layers have a drain contact hole exposing a portion of the thin film transistor, and the first and second passivation layers and the interlayer insulating layer have third and fourth contact holes respectively exposing both ends of the connection line,
wherein one end of the first connection pattern contacts the X direction sensing line in the first region through the first contact hole, and the other end of the first connection pattern contacts one end of the connection line through the third contact hole, and
wherein one end of the second connection pattern contacts the X direction sensing line in the third region through the second contact hole, and the other end of the second connection pattern contacts the other end of the connection line through the fourth contact hole.

35. A capacitive touch sensing type liquid crystal display device, comprising:
an array substrate including a first substrate, a gate lien, a data line, a common electrode, a pixel electrode, and a touch sensing unit including an X direction sensing line extending along a direction of the gate line and a Y direction sensing line extending along a direction of the data line;
a color filter substrate including a second substrate and facing the array substrate;
an anti-static layer on an outer side of the second substrate and including a conductive polymer, one of a UV-setting binder and a thermo-setting binder, and a stabilizer and having a sheet resistance of several tens Mega ohms per square (Ω/sq) to several Giga ohms per square (Ω/sq); and
a liquid crystal layer between the first substrate and an inner side of the second substrate,
wherein the X direction sensing line overlaps the gate line, and the Y direction sensing line overlaps the data line, and the X direction sensing line and the Y direction sensing line are formed on the common electrode, and
wherein the X direction sensing line and the Y direction sensing line are configured to sense a change of capacitance between the common electrode and an object touching the anti-static layer.

36. The device according to claim 35, wherein the conductive polymer includes one of polyaniline, poly(3,4-ethylenedioxythiophene) (PEDOT), polyacetylene, polypyrrole, polythiophene, and polysulfurnitride, and the stabilizer includes one of 2,5-dihydro-1H-imidazole, 3,4-dihydroxyfuran-2(5H)-one, and 3,4,5-trihydroxybenzoic acid.

37. The device according to claim 35, wherein a range of the sheet resistance is maintained even when it is exposed to a temperature of 60° C. to 100° C., a humidity of 60 to 100% and a time above 200 hours.

38. The device according to claim 35, wherein the thermosetting binder includes one of tetraethoxysilane (TEOS) and tetramethoxysilane (TMOS) and is cured under a temperature below 100 ☐.

39. The device according to claim 35, wherein a weight ratio of each of the conductive polymer and the stabilizer to one of the UV-setting binder and the thermo-setting binder is about 0.5:99.5 to about 10:90.

40. The device according to claim 35, wherein the antistatic layer has a thickness of 500 to 5000 Å.

41. The device according to claim 35, wherein the antistatic layer has a hardness of 7 to 9H.

42. The device according to claim 35, wherein the touch sensing unit further includes:
    an X direction sensing circuit at one end of the X direction sensing line; and
    a Y direction sensing circuit at one end of the Y direction sensing line,
    wherein a change of capacitance by a touch is detected by the X direction sensing circuit and the Y direction sensing circuit through the X direction sensing line and the Y direction sensing line, respectively.

43. The device according to claim 42, wherein a plurality of touch blocks are defined on the first substrate, and each touch block includes first to third regions, each of which includes at least one pixel region, and wherein the X direction sensing line is disposed at the first and third regions, and the Y direction sensing line is disposed at the second region.

44. The device according to claim 43, wherein the X direction sensing line in the first region is electrically connected to the X direction sensing line in the third region.

45. The device according to claim 44, wherein the touch sensing unit further includes a connection line in the second region for electrical connection of the X direction sensing line in the first region and the X direction sensing line in the third region.

46. The device according to claim 44, wherein the common electrode has an island shape in each of the first to third regions, and the X and Y direction sensing lines contacts the common electrode.

47. The device according to claim 35, wherein the array substrate further includes:
    an interlayer insulating layer on the gate line;
    a thin film transistor in each pixel region and connected to the gate and data lines;
    a first passivation layer on the data line and the thin film transistor, wherein the common electrode is disposed on the first passivation layer and has an island shape in each of the first to third regions; and
    a second passivation layer over the common electrode, wherein the first and second passivation layers have a drain contact hole exposing a portion of the thin film transistor,
    wherein the pixel electrode is disposed on the second passivation layer and contacts the portion of the thin film transistor through the drain contact hole, and wherein the data line is disposed on the interlayer insulating layer and corsses the gate line to define a plurality of pixel regions, and a plurality of pixel regions form each of first to third regions.

48. The device according to claim 47, wherein the pixel electrode has at least one opening to generate a fringe field with the common electrode.

49. The device according to claim 47, wherein the color filter substrate further includes:
    a black matrix corresponding to boundaries of each pixel region; and
    a color filter layer corresponding to the each pixel region.

50. The device according to claim 47, wherein the touch sensing unit further includes:
    a connection line in the second region under the interlayer insulating layer;
    first and second connection patterns on the second passivation layer,
    wherein the X direction sensing line is disposed on the common electrode in the first and third regions, and the Y direction sensing line is disposed on the common electrode in the second region,
    wherein the second passivation layer has a first contact hole exposing an end of the X direction sensing line in the first region and a second contact hole exposing an end of the X direction sensing line in the third region, wherein the first and second passivation layers have a drain contact hole exposing a portion of the thin film transistor, and the first and second passivation layers and the interlayer insulating layer have third and fourth contact holes respectively exposing both ends of the connection line,
    wherein one end of the first connection pattern contacts the X direction sensing line in the first region through the first contact hole, and the other end of the first connection pattern contacts one end of the connection line through the third contact hole, and
    wherein one end of the second connection pattern contacts the X direction sensing line in the third region through the second contact hole, and the other end of the second connection pattern contacts the other end of the connection line through the fourth contact hole.

* * * * *